(12) United States Patent
Kawakami et al.

(10) Patent No.: US 7,260,326 B2
(45) Date of Patent: Aug. 21, 2007

(54) WAVELENGTH-DIVISION MULTIPLEX SYSTEM AND A METHOD OF AUTOMATICALLY SETTING CONVERSION WAVELENGTHS OF SUCH A SYSTEM

(75) Inventors: Kouji Kawakami, Kawasaki (JP); Kazutaka Kikuta, Kawasaki (JP); Shingo Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 628 days.

(21) Appl. No.: 10/349,924

(22) Filed: Jan. 24, 2003

(65) Prior Publication Data

US 2003/0228149 A1 Dec. 11, 2003

(30) Foreign Application Priority Data

Jun. 5, 2002 (JP) .............................. 2002-164675

(51) Int. Cl.
*H04J 14/02* (2006.01)
(52) U.S. Cl. .......................................... 398/48; 398/82
(58) Field of Classification Search ................. 398/34, 398/36, 69, 48–51, 82–88
See application file for complete search history.

(56) References Cited

U.S. PATENT DOCUMENTS 6,498,871 B1 * 12/2002 Kuboki ........................ 385/24
2004/0042796 A1 * 3/2004 Con-Carolis et al. ......... 398/83

FOREIGN PATENT DOCUMENTS

JP 2000-41024 2/2000
JP 2000-298297 10/2000

* cited by examiner

*Primary Examiner*—Leslie Pascal
(74) *Attorney, Agent, or Firm*—Staas & Halsey LLP

(57) ABSTRACT

For a WDM device including a multiplexer receiving fixed wavelengths, wavelength-converting parts for converting input wavelengths from optical transmission devices into the fixed wavelengths, and interface parts provided between the multiplexer and the wavelength-converting parts and having a specific wavelength that matches the fixed wavelength of the multiplexing part, a method and a device is provided for automatically determining the specific wavelength of the interface part that is to be selected as a converted wavelength output from the wavelength-converting part.

21 Claims, 39 Drawing Sheets

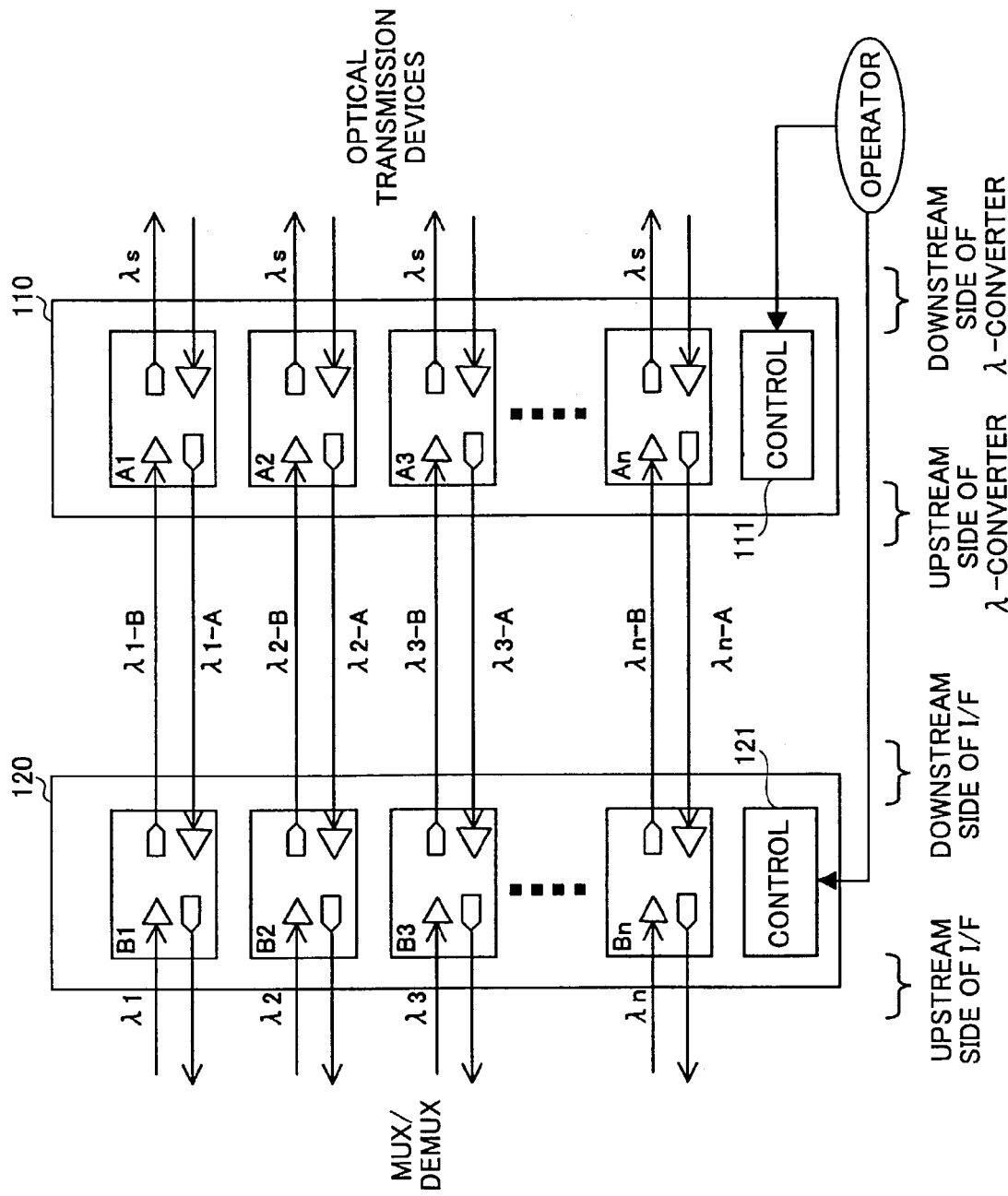

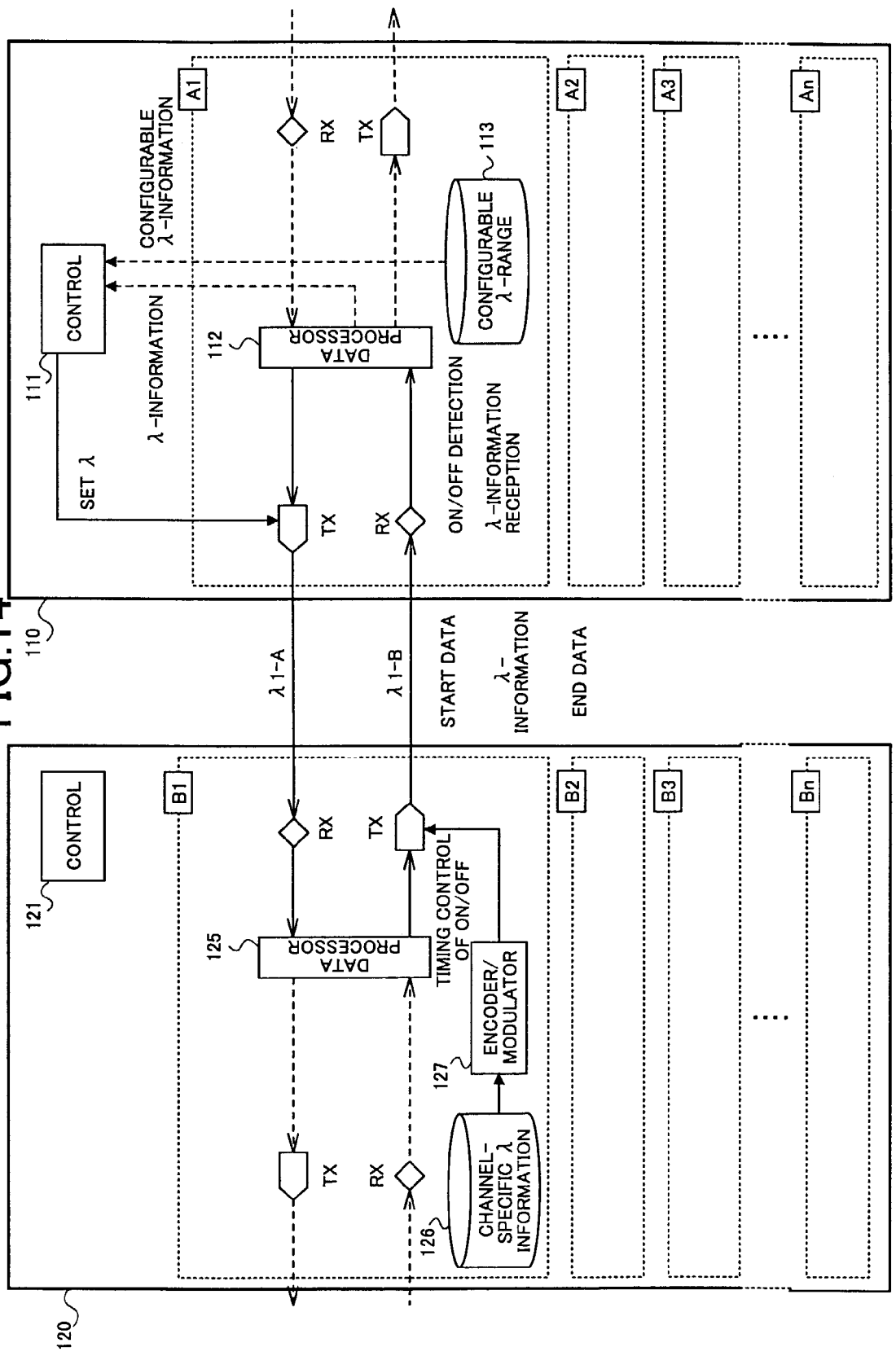

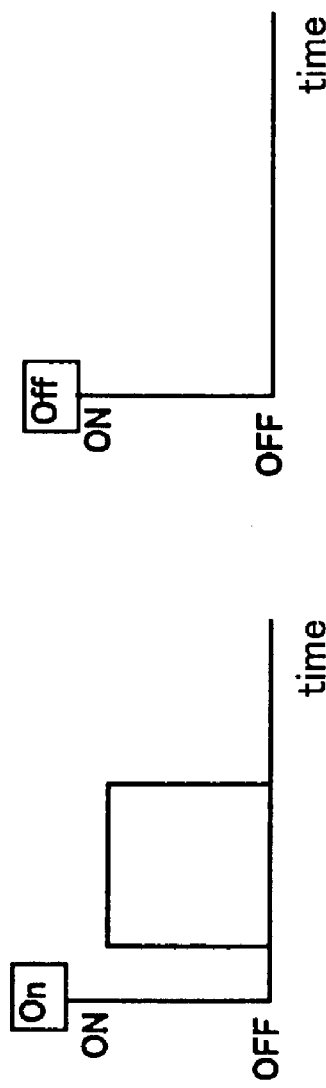
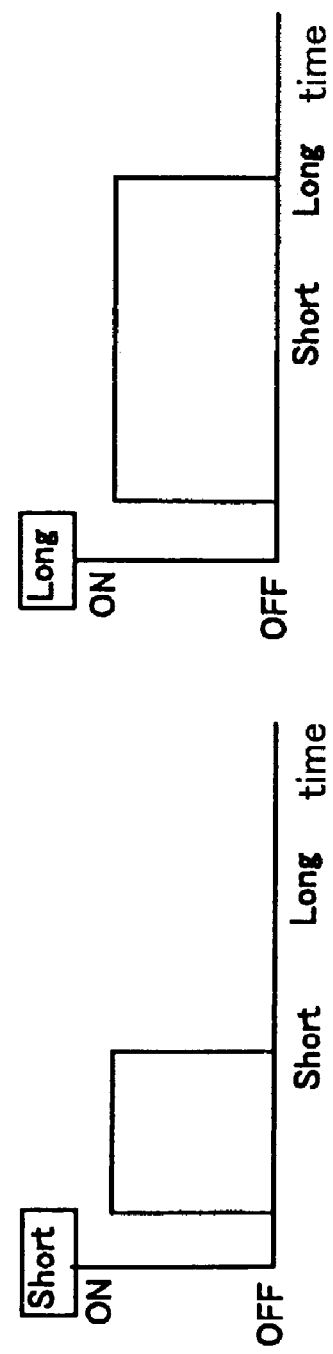
FIG.15A
FIG.15B

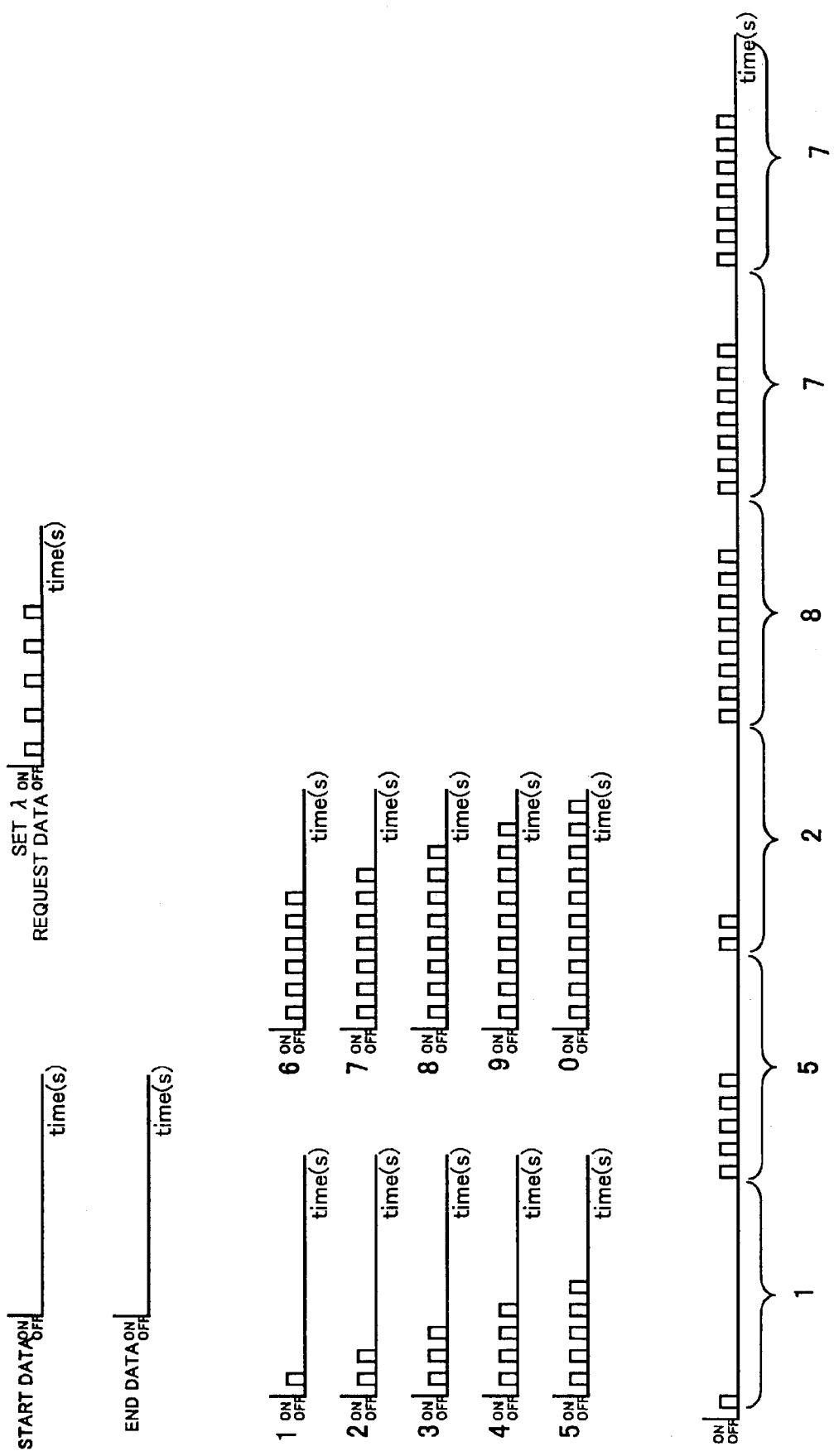

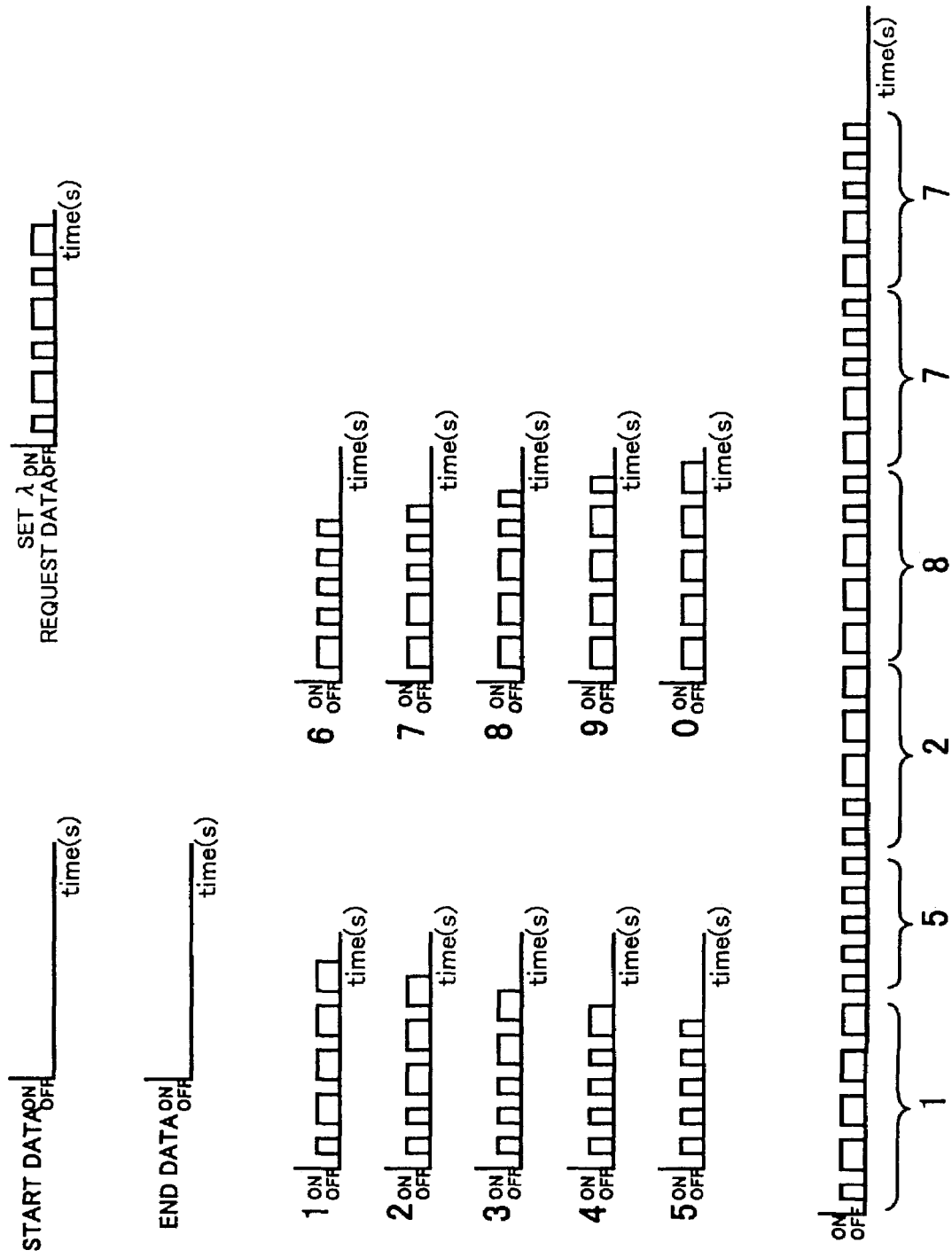

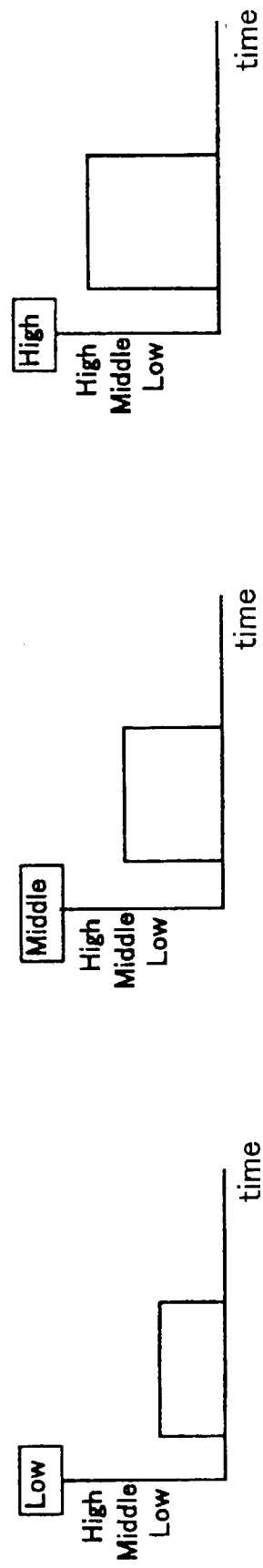

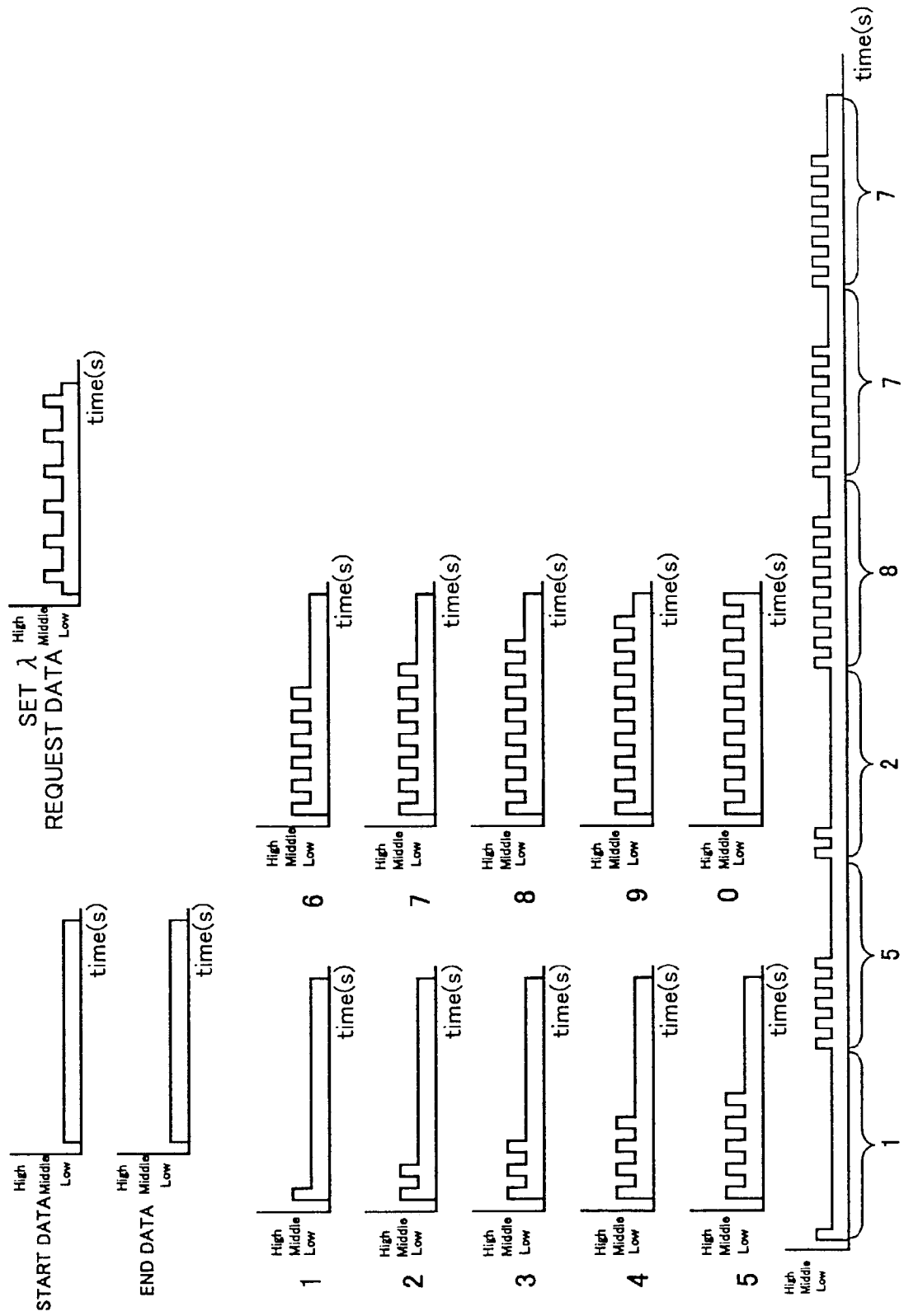

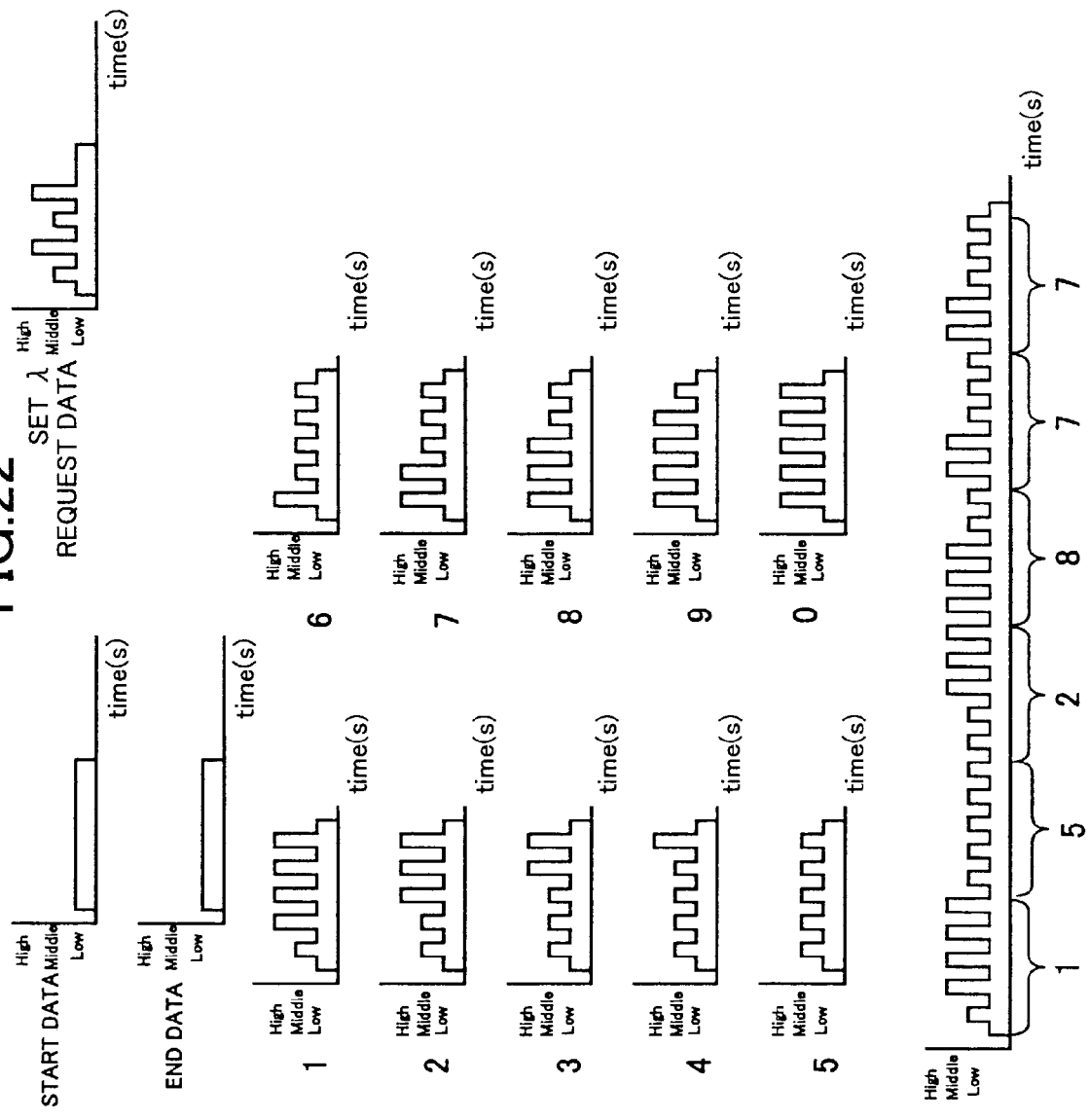

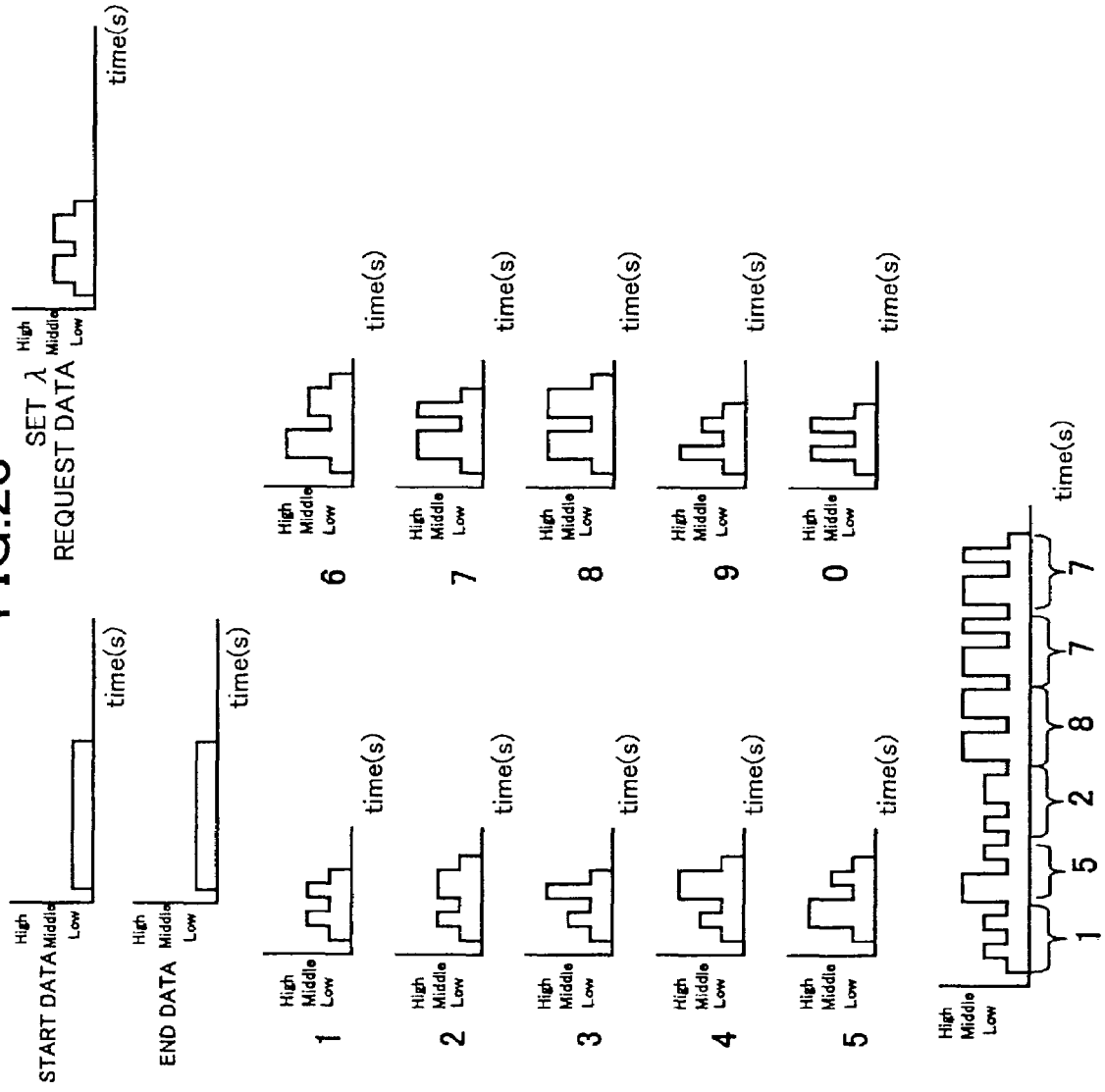

WAVELENGTH-DIVISION MULTIPLEX SYSTEM AND A METHOD OF AUTOMATICALLY SETTING CONVERSION WAVELENGTHS OF SUCH A SYSTEM

BACKGROUND OF THE INVENTION

1. Field of the Invention

The present invention relates to a wavelength-division multiplex system that enables an efficient use of optical fibers and particularly to an improved method of setting wavelengths to be allocated to each transmission channel in such a wavelength-division multiplex system.

Recently, optical transmission systems provided with lines with larger capacity are being developed. Wavelength-division multiplexing (WDM) technology is becoming of an interest as a technology that is necessary for making efficient use of optical fibers.

FIG. 1 is a diagram showing an example of a WDM system. In the example shown in FIG. 1, the WDM system includes two WDM devices connected to each other. Each of the WDM devices includes a wavelength-converting unit ($\lambda$-converter) 110, a wavelength interface unit (I/F) 120 and a wavelength multiplexer/demultiplexer (MUX/DEMUX) 130. The wavelength-converting unit 110 receives signals of wavelength $\lambda$s from downstream optical transmission devices 200-1 through 200-$n$ and converts the wavelength $\lambda$s into wavelengths $\lambda 1$ through $\lambda n$ that are to be used on the upstream side of the wavelength-converting unit 110, or, used by the wavelength interface unit 120. In order to perform such a converting operation, the wavelength-converting unit 110 is configured using wavelengths $\lambda 1$ through $\lambda n$ that correspond to channels of the wavelength interface unit 120. The wavelength interface unit 120 is provided with channels with predetermined wavelengths $\lambda$, i.e., $\lambda 1$ through $\lambda n$, that are fixed to and individually usable for the corresponding input terminals of the MUX/DEMUX 130 connected thereto. It is to be noted that in the following text, "upstream" is to be understood as a position along the transmission path nearer to the MUX/DEMUX 130 side and "downstream" is to be understood as a position along the transmission path nearer to the optical transmission devices 200-1, . . . , 200-$n$.

Signals of wavelengths $\lambda 1$ through $\lambda n$ that are output from upstream output terminals of the wavelength interface unit 120 are received and multiplexed by the MUX/DEMUX 130. The multiplexed signals are simultaneously transmitted through an optical fiber. Then, the multiplexed signals are transmitted to an opposing receiving-side WDM device in which the MUX/DEMUX 130 demultiplexes the multiplexed signals back to original signals. In this manner, the optical fiber can be used with improved efficiency.

Currently, the WDM device is not capable of multiplexing a plurality of signals of the same wavelength $\lambda$. Therefore, wavelengths $\lambda$ of the signals should be set at the wavelength-converting unit 110 such that the wavelengths $\lambda$ of the signals received at the MUX/DEMUX 130 do not overlap with each other.

In order to set wavelengths $\lambda$ at the wavelength-converting unit 110, the operator needs to know available wavelengths $\lambda$ and set different wavelengths $\lambda$ for each of the channels to be multiplexed. Therefore, a wavelength-setting operation is burdensome for the operator. Also, it is expected that the numbers of channels to be multiplexed will increase in the future. For at least the reasons described above, there is a need for a method of facilitating the wavelength-setting operation for a wavelength-multiplexing process.

2. Description of the Related Art

FIG. 2 is a diagram showing an example of a WDM device of the related art. Herein, "upstream" is to be understood as a position nearer to the MUX/DEMUX 130 side and "downstream" is to be understood as a position nearer to the optical transmission devices 200-1, . . . , 200-$n$. In this example, upstream input terminals of the wavelength-converting unit 110 are capable of receiving a plurality of different wavelengths $\lambda$. Therefore, it is not necessary to set wavelengths $\lambda$ for transmissions from downstream output terminals of the wavelength interface unit 120 to the upstream input terminal of the wavelength-converting unit 110. On the other hand, each of the downstream input terminals of the wavelength interface unit 120 is configured to receive a fixed wavelength $\lambda$ for each channel. Therefore, the operator no longer needs to set wavelengths $\lambda$ for transmission from the upstream output terminals of the wavelength-converting unit 110 and the downstream input terminals of the wavelength interface unit 120.

For each of channels of the wavelength-converting unit 110, a range of wavelength $\lambda$ that can be configured (configurable $\lambda$-range) is predetermined. Therefore, the operator needs to configure a wavelength $\lambda$ of each channel on the basis of a wavelength $\lambda$ that can be used at wavelength interface subunits of the wavelength interface unit and on a predetermined range of wavelength $\lambda$ that can be set in the wavelength-converting unit 110 connected to the wavelength interface unit 120 via an optical fiber. The wavelength $\lambda$ is, for example, configured in a manner described below (see FIGS. 3, 4A and 4B).

The operator operates a control part 121 of the wavelength interface unit 120 to input a request for causing the wavelength interface unit 120 to change into an operating state (step S1).

The operator looks up for wavelength $\lambda$ that can be received by the wavelength interface subunits of the wavelength interface unit 120 that is to be set up (step S2).

The operator looks up for a range of the wavelength $\lambda$ that can be configured (configurable range) to the wavelength-converting subunits of the wavelength-converting unit 110 connected to the corresponding wavelength interface subunits of the wavelength interface unit 120 (step S3).

The operator specifies wavelength $\lambda$ and sends a request to the control part 111 of the wavelength-converting unit 110 for setting the specified wavelength $\lambda$ (step S4).

The control part 111 searches for the specified wavelength $\lambda$ in the configurable $\lambda$-range (step S5).

It is determined whether the specified wavelength $\lambda$ is in the configurable $\lambda$-range and can be output as a wavelength $\lambda$ of the relevant wavelength-converting subunit of the wavelength-converting unit 110 (step S6).

If it is determined that the specified wavelength $\lambda$ cannot be output (step S6, NO), an NG signal is sent to inform the operator that the specified $\lambda$ cannot be set. Then, steps S2 to S5 are repeated.

If it is determined that the specified wavelength $\lambda$ can be output (step S6, YES), an OK signal is sent to the operator to inform that the specified $\lambda$ can be set. Then, the operator sets the specified $\lambda$ as a wavelength $\lambda$ for the relevant wavelength-converting subunit of the wavelength-converting unit 110 and sends main signals to the wavelength interface unit 120 using the specified $\lambda$ (step S7).

The operator confirms whether optical transmission, or the main signal, using the specified wavelength $\lambda$ is received at the wavelength interface unit 120 (step S8).

If reception of the optical transmission is confirmed, the wavelength setting operation is terminated. If reception of the optical transmission is not confirmed, steps S2 to S8 are repeated.

Steps S1 to S8 are repeated for each channel.

There are several drawbacks with such a wavelength-setting operation of the related art.

First, since each of the downstream input terminals of the wavelength interface unit 120 can receive a fixed wavelength, the operator needs to search for a usable wavelength λ. If the operator mistakenly sets the wavelength λ, the data cannot be transmitted and a setting operation of the wavelength λ must be performed again.

Second, the wavelength-setting operation of the related art requires many steps of complicated manual operations by the operator. This may result in man-caused erroneous operations.

Third, according to the wavelength setting operation of the related art, wavelength setting should be repeated for a number of channels to be multiplexed. Therefore, it requires considerable efforts by the operator.

Fourth, according to the wavelength setting operation of the related art, the operator is not informed of alteration of connected channels. Therefore, the user may try to transmit signals using an erroneously specified wavelength. In such a case, data cannot be transmitted until the operator becomes aware of the error and reconfigures the wavelength.

SUMMARY OF THE INVENTION

Accordingly, it is a general object of the present invention to provide a WDM device in which a process of setting wavelengths λ for wavelength-converting parts can be performed without manual operations.

It is another and more specific object of the present invention to provide a WDM device in which information of the channel-specific wavelength of the interface part between the multiplexer and the wavelength-converting part is supplied to the wavelength-converting part.

According to the present invention, a wavelength-division multiplexing (WDM) device is provided which includes: a multiplexing part having a plurality of input terminals that are capable of receiving fixed wavelengths, respectively, and an output terminal, the fixed wavelengths being multiplexed onto a multiplexed signal and output via the output terminal; a plurality of wavelength-converting parts each connected to an optical transmission device so as to convert an input wavelength from the optical transmission device into a converted wavelength corresponding to the fixed wavelength; and a plurality of interface parts each connected between the input terminal of the multiplexing part and the wavelength-converting part, the interface part having a specific wavelength that matches the fixed wavelength of the input terminal of the multiplexing part.

According to one embodiment, the interface part is provided with a filter that allows the specific wavelength to pass through and an encoder/modulator that encodes and modulates the filtered signal into a pattern specific to the interface part. The specific wavelength of the interface part is detecting by sequentially altering the converted wavelength, analyzing wavelengths of the multiplexed signal to detect the encoded and modulated signal wherefrom the pattern specific to the interface part is obtained and identifying the interface part and its specific wavelength.

According to another embodiment, the interface part encodes and modulates an optical signal in a pattern specific to its specific wavelength and transmits the encoded and modulated optical signal to the wavelength-converting part connected thereto. The specific wavelength of the interface part is detected by reading the specific wavelength from a modulated component of the encoded and modulated optical signal.

According to a further embodiment, the specific wavelength of the interface part is detected by the interface part transmitting optical signals of its specific wavelength to the wavelength-converting part connected thereto, and the wavelength-converting part analyzing the wavelength of the transmitted optical signal to detect the specific wavelength of the interface part.

According to a further embodiment, the specific wavelength of the interface part is determined by the interface part transmitting optical signals of its specific wavelength to the wavelength-converting part connected thereto, and the optical signals of the specific wavelength being supplied to a variable wavelength filter provided in the wavelength-converting part while varying the pass-band wavelength of the variable wavelength filter so as to obtain the pass-band wavelength of the filter when the optical signal is allowed to pass through.

According to a further embodiment, the plurality of interface parts simultaneously generate and output a plurality of signals with different wavelengths, respectively, by wavelength conversion. Each of the interface parts is provided with a filter that only allows a signal having its specific wavelength to pass through.

Also, methods of automatically setting a converted wavelength output from each of a plurality of wavelength-converting parts of a wavelength-division multiplexing (WDM) device are provided.

With the WDM devices and methods described above, erroneous setting of wavelength λ can be prevented. Also, since the operator's intervention is reduced, reliability of the wavelength setting operation can be improved. Also, troublesome operation is reduced and convenience of the operation is improved.

BRIEF DESCRIPTION OF THE DRAWINGS

FIG. 5 is a general configuration diagram showing the WDM device of the present invention;

FIG. 14 is a block diagram showing a WDM device of a fourth embodiment of the present invention;

FIGS. 15A and 15B are diagrams showing time-charts of examples of modes of modulation of optical signals that can be applied to the WDM device of the fourth embodiment of the present invention;

FIG. 16 is a diagram showing time-charts of an example of another mode of modulation of optical signals that can be applied to the WDM device of the fourth embodiment of the present invention;

FIG. 17 is a diagram showing time-charts of an example of still another mode of modulation of optical signals that can be applied to the WDM device of the fourth embodiment of the present invention;

FIG. 19 is a diagram showing time-charts of an example of a mode of modulation of optical signals that can be applied to the WDM device of the fifth embodiment of the present invention;

FIG. 21 is a diagram showing time-charts of an example of still another mode of modulation of optical signals that can be applied to the WDM device of the fifth embodiment of the present invention;

FIG. 22 is a diagram showing time-charts of an example of yet another mode of modulation of optical signals that can be applied to the WDM device of the fifth embodiment of the present invention;

FIG. 23 is a diagram showing time-charts of an example of yet another mode of modulation of optical signals that can be applied to the WDM device of the fifth embodiment of the present invention;

DETAILED DESCRIPTION OF THE PREFERRED EMBODIMENTS

In the following, principles and embodiments of the present invention will be described with reference to the accompanying drawings.

FIG. 5 is a diagram showing a basic configuration of a wavelength-converting unit 110 and a wavelength interface unit 120 of a WDM (Wavelength-Division Multiplexing) system of the present invention. Herein, "upstream" is to be understood as a position nearer to the MUX/DEMUX 130 side and "downstream" is to be understood as a position nearer to the optical transmission devices 200-1, . . . , 200-n. In an example shown in FIG. 5, "upstream" refers to the left-hand side of each box and "downstream" refers to the right-hand side of each box.

The wavelength interface unit 120 includes wavelength interface subunits B1 through Bn (n is an integer greater than one) each having output and input terminals on each of the downstream and upstream sides. Each of the wavelength interface subunits B1, . . . , Bn has an individually and fixedly usable optical wavelength. Wavelength information indicating wavelengths of the wavelength interface subunits B1, . . . , Bn is referred to as "channel-specific λ information" and is stored in the wavelength interface unit 120. Herein after, optical wavelength is generally denoted as "λ" and individually and fixedly usable optical wavelengths for the wavelength interface subunits are denoted by "λ1, . . . , λn."

The wavelength-converting unit 110 includes wavelength-converting subunits A1 through An, each of which may be set with a wavelength λ that corresponds to a channel-specific wavelength of one of the wavelength interface subunits B1, . . . , Bn. With the wavelength λ being set, the wavelength-converting unit 110 converts a wavelength used on its downstream side, hereinafter referred to as λs, into wavelengths λ1, . . . , λn that are used on its upstream side. The downstream side input/output terminals of the wavelength interface subunits B1, . . . , Bn are connected to the upstream side output/input terminals of the wavelength-converting subunits A1, . . . , An, respectively. Such a state may be, hereinafter described using a term "opposed" or alternate forms thereof. According to the present invention, wavelength λs of the signal input into the wavelength-converting unit 110 from its downstream side can be converted into the wavelengths λ1, . . . , λn used on its upstream side, without requiring manual operation by the operator. In other words, a setting operation of wavelengths, i.e., λ-setting, can be performed automatically.

Various embodiment of the present invention will be described below.

Figure 1:
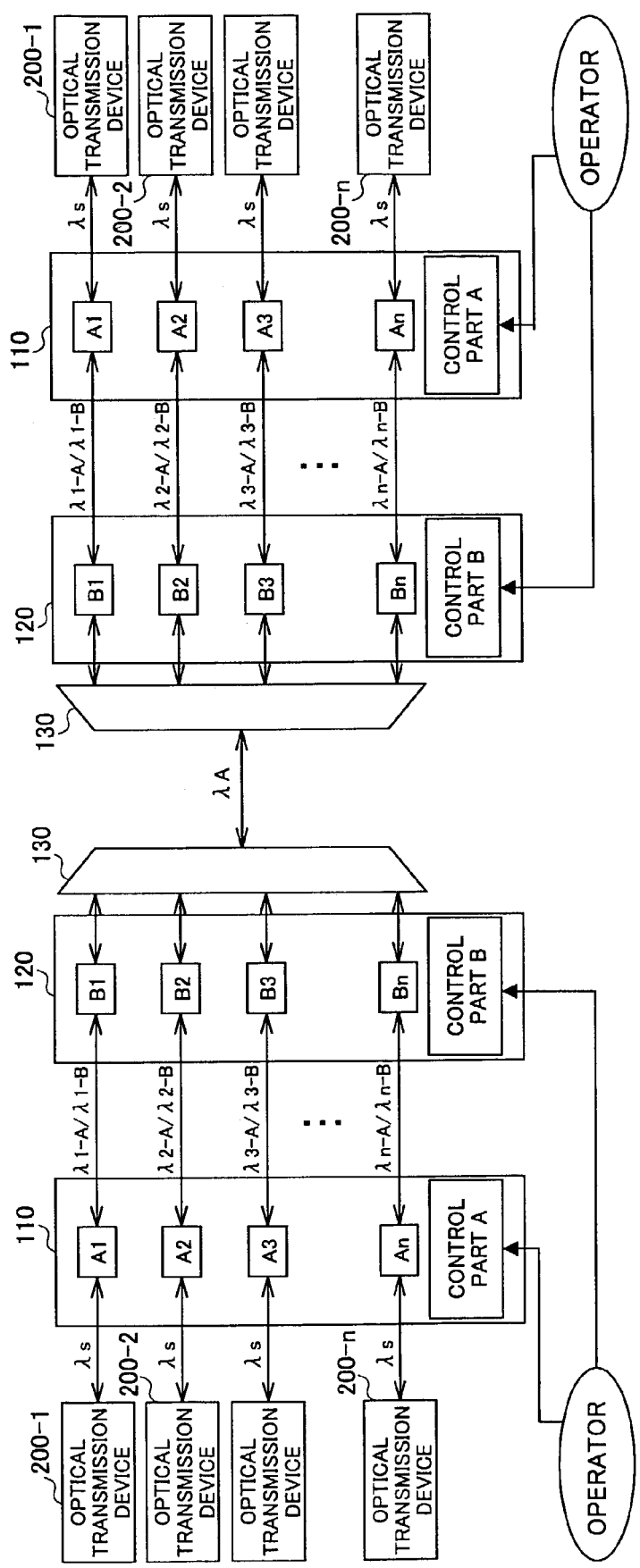
FIG. 1 is a diagram showing a general structure of a WDM system.
Figure 2:
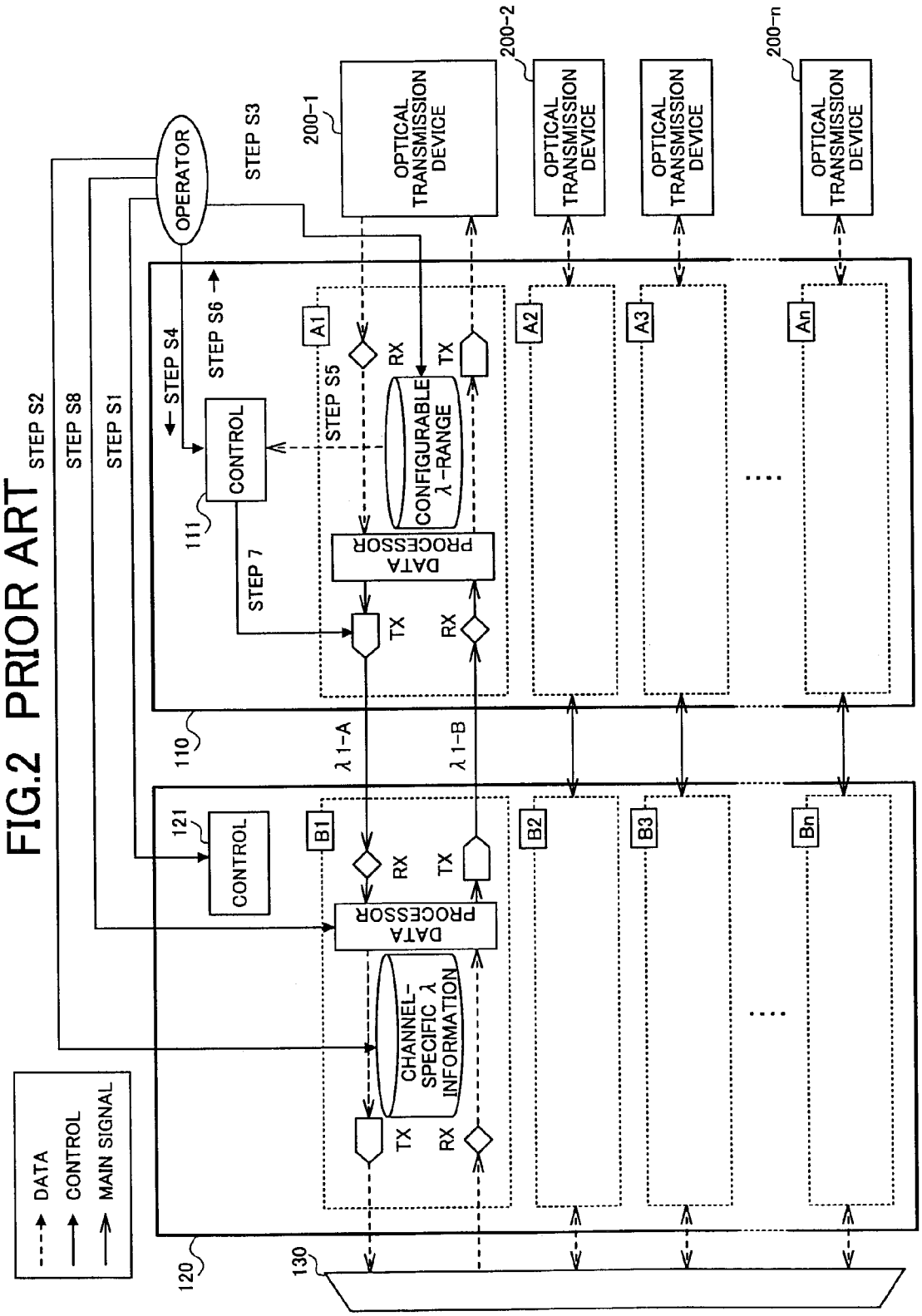
FIG. 2 is a block diagram of a WDM device of the related art.
Figure 3:
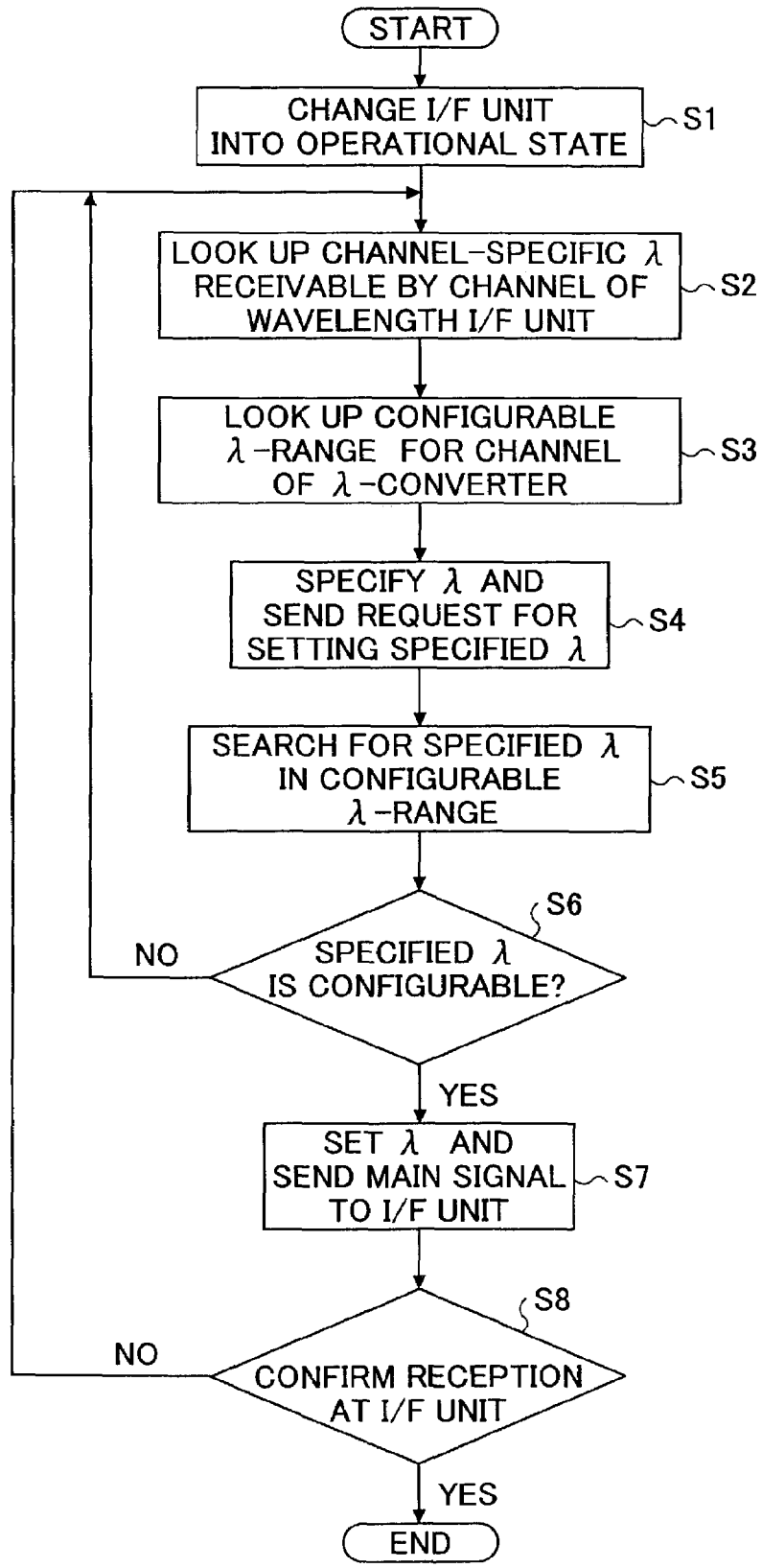
FIG. 3 is a flowchart showing process steps of an operation of the WDM device of the related art.
Figure 4A:
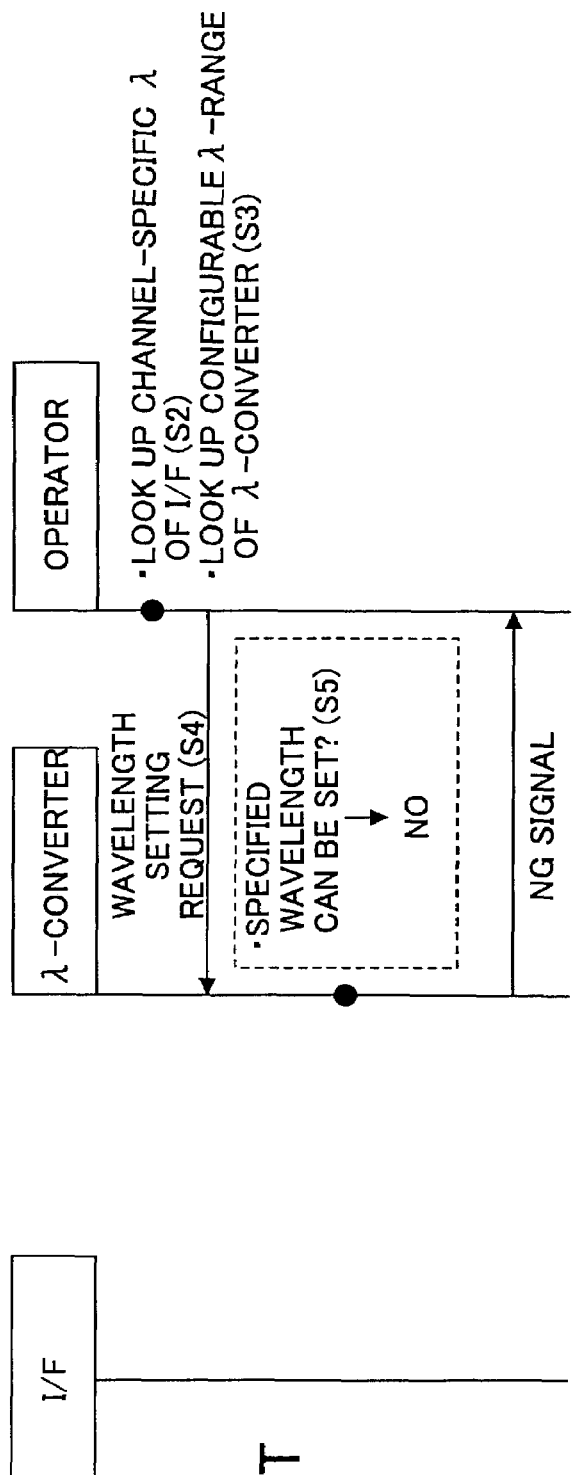
FIGS. 4A and 4B are operational sequence diagrams showing an operation of setting wavelength at a wavelength-converting unit of the WDM device of the related art.
Figure 4B:
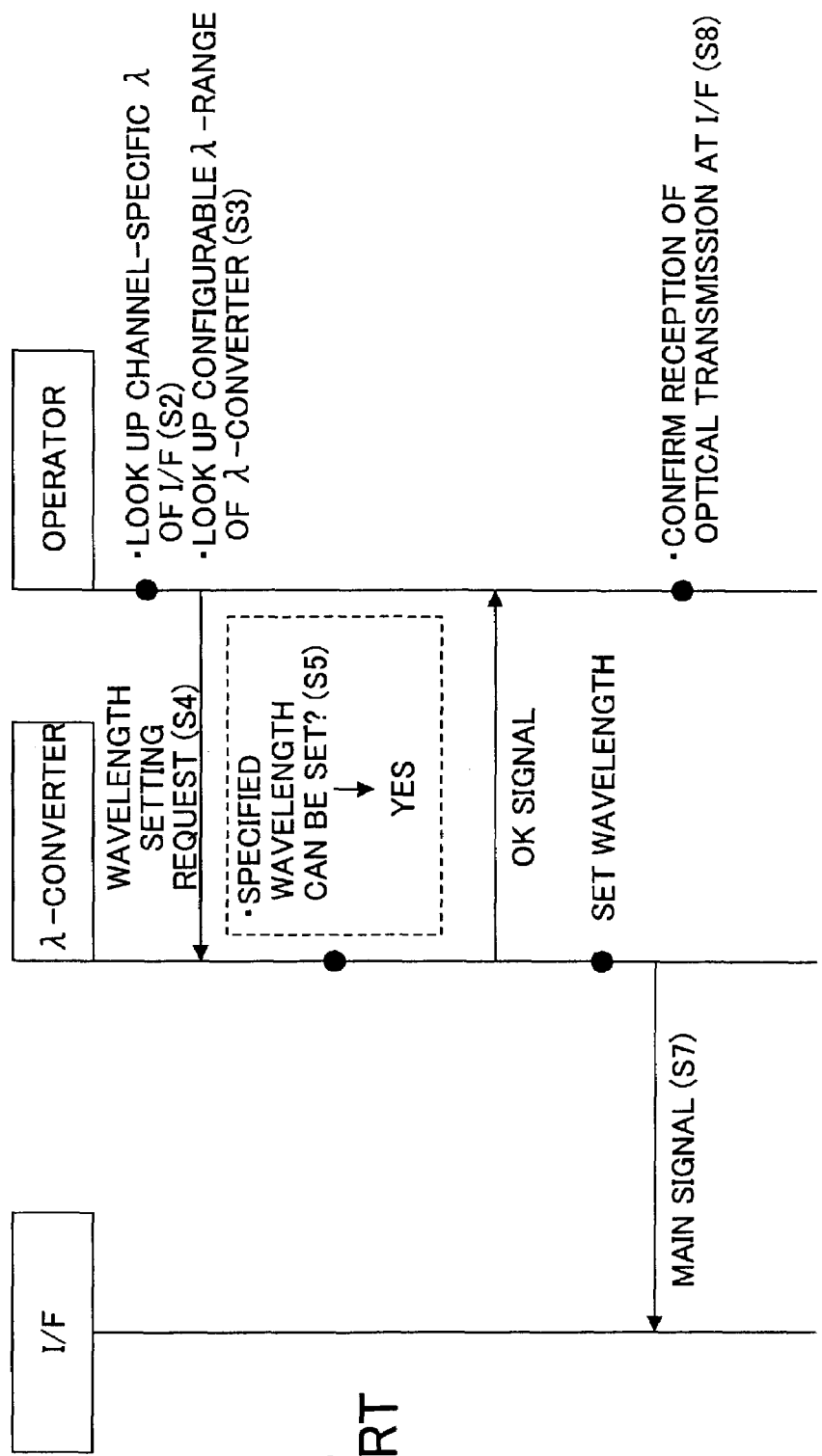
Figure 6:
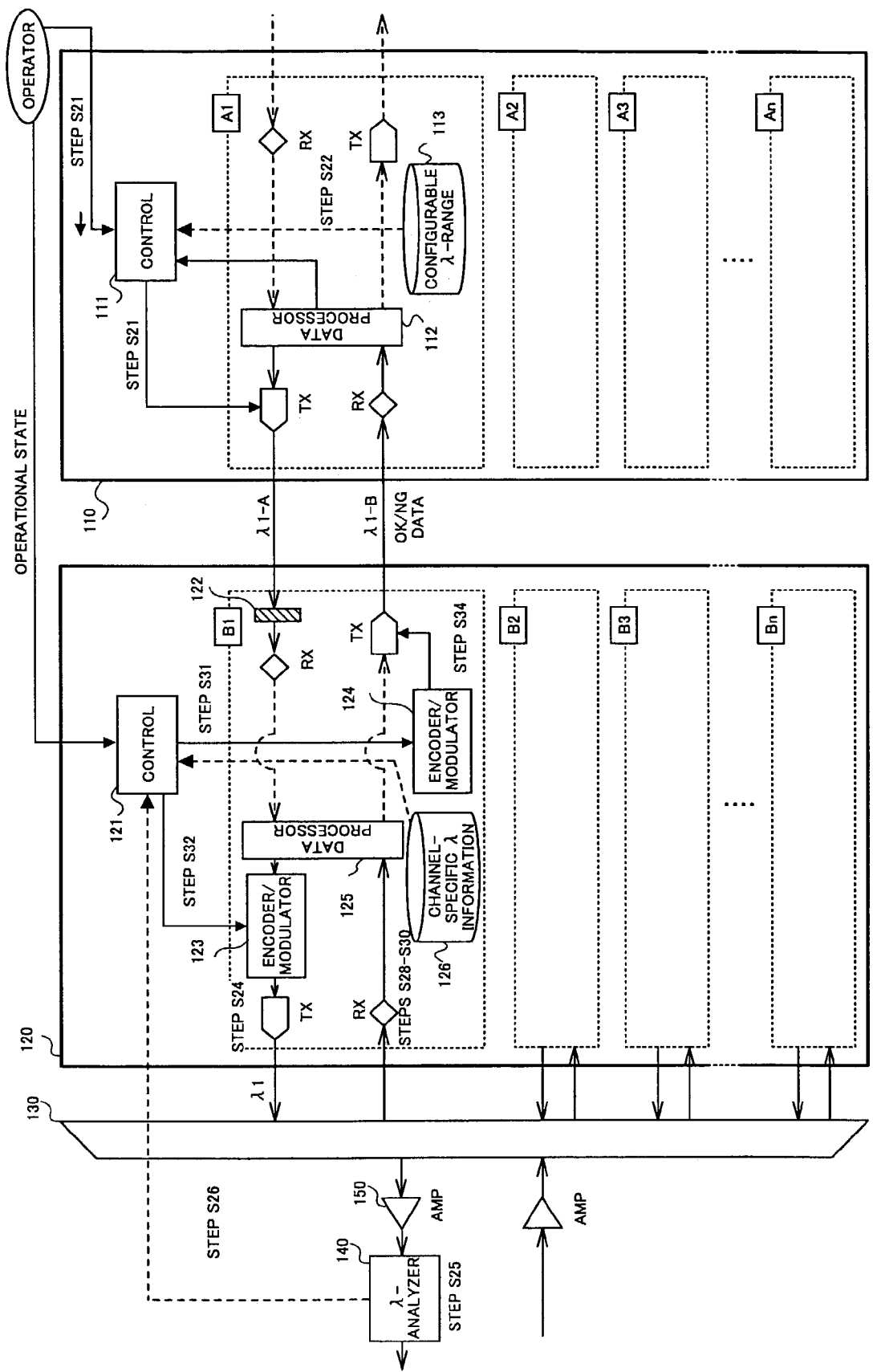
FIG. 6 is a block diagram showing a WDM device of a first embodiment of the present invention.

FIG. 6 is a block diagram showing a configuration of the WDM device of the first embodiment of the present invention. As shown in the figure, the WDM device includes the wavelength-converting unit 110, the wavelength interface unit 120 and the MUX/DEMUX 130. The wavelength-converting unit 110 is connected to optical transmission devices so as to receive signals to be multiplexed and to convert wavelengths of the received signals. The wavelength interface unit 120 performs ON/OFF control of the signals received from the wavelength-converting unit 110 at predetermined timings. The MUX/DEMUX 130 multiplexes the plurality of signals from the wavelength interface unit 120 and transmits the multiplexed signals to an optical fiber. The MUX/DEMUX 130 may be replaced by a multiplexer if the WDM device is only used for transmitting signals.

FIG. 6 shows that the wavelength-converting unit 110 includes the wavelength-converting subunits A1, . . . , An, each converting the wavelength of the signal received from corresponding optical device of each channel and outputting the converted signal to the wavelength interface unit 120. It is also shown that the wavelength interface unit 120 includes wavelength interface subunits B1, . . . , Bn, each coupling the signals from the corresponding wavelength-converting subunits A1, . . . , An, to the corresponding downstream input terminal of the MUX/DEMUX 130 for each channel.

The wavelength-converting subunits A1, . . . , An output signals in such a manner that the wavelength $\lambda$ is varied at a predetermined interval under control of the control part 111. A program for causing such an operation may be stored for this purpose. Each of the wavelength interface subunits B1, . . . , Bn is provided with a filter 122 that allows signals having a wavelength $\lambda$ that matches the fixedly and individually predetermined channel-specific wavelength $\lambda$ of the wavelength interface subunits B1, . . . , Bn to pass through. In the following text, one of the wavelength-converting subunits A1, . . . , An is generally denoted by "Ax" and the corresponding wavelength interface subunit B1, . . . , Bn is generally denoted by "Bx".

In order to perform $\lambda$-analysis to verify, even after being multiplexed by the MUX/DEMUX 130, that the signals from the upstream terminal of Bx is actually output via the MUX/DEMUX 130, the wavelength interface subunit Bx is further provided with a first encoder/modulator (ON/OFF control) part 123 at a position upstream of the filter 122. The first encoder/modulator part 123 switches its output signal between ON and OFF states to transmit channel number information of the corresponding wavelength interface subunit Bx to the upstream side (MUX/DEMUX 130 side) in the form an ON/OFF signal, or, a modulated signal (binary values expressed by "0" and "1"). Further, a $\lambda$-analyzer 140 is provided at a position upstream of an amplifier 150 that is at a position upstream of the MUX/DEMUX 130. ON/OFF patterns are predetermined uniquely for the wavelength interface subunits B1, . . . , Bn, respectively. Thus, by detecting the ON/OFF patterns at the $\lambda$-analyzer 140 after the signals are being multiplexed, it is verified that the signals of the relevant channel has passed through the MUX/DEMUX 130. It is to be noted that the signal having the relevant ON/OFF pattern is transmitted to the MUX/DEMUX 130 side, i.e., upstream side, only if the signal from the optical transmission device has been allowed to pass through the filter 122.

If the $\lambda$-analyzer 140 detects that the DATA signals from the wavelength interface subunit Bx are being output from the MUX/DEMUX 130, this is reported to the relevant wavelength interface subunit Bx.

Further, a second encoder/modulator (ON/OFF control) part 124 is provided in each of the wavelength interface subunits Bx for checking signals that are output from each of the wavelength-converting subunits Ax of the wavelength-converting unit 110. It is determined whether the wavelength $\lambda$ of the signals transmitted from the wavelength-converting subunit Ax to the corresponding wavelength interface subunit Bx of the wavelength interface unit 120 matches the channel-specific wavelength $\lambda$ that has been fixedly allocated to the relevant wavelength interface subunit Bx. An OK/NG signal is produced by controlling the ON/OFF state of the signal and the OK/NG signal is transmitted from the downstream terminal of the wavelength interface subunit Bx to the relevant wavelength-converting subunit Ax.

An operation of the first embodiment of the present invention will be described with reference to a flowchart of FIG. 7.

The following description relates to a process of automatically setting a wavelength $\lambda$x-A set for signals that are output from the upstream terminal of the wavelength-converting subunit Ax of the wavelength-converting unit 110. Requirements for the process described below are that the wavelength interface unit 120 is in its operational state, that the wavelength-converting unit 110 and the wavelength interface unit 120 are arranged so as to oppose each other, and that it is not necessary that the main signals are communicated from the wavelength interface unit 120 to the wavelength-converting unit 110.

In step 21, the operator inputs a DATA output request for wavelength-converting subunit Ax into the control part 111 of the wavelength-converting unit 110 in order to request the wavelength-converting subunit Ax to output signals to the wavelength interface subunit Bx. The wavelength-converting subunit Ax corresponds to a channel that is to undergo a wavelength-setting operation ($\lambda$-setting).

In step 22, the control part 111 of the wavelength-converting unit 110 selects a wavelength $\lambda$ to be set from a first storage part 113 in which configurable wavelengths $\lambda$ that can be output are stored. The specified $\lambda$ is stored in a variable "lambda_temp".

In this manner, the wavelength-converting unit 110 sets the wavelength $\lambda$ as ($\lambda$1-A) and transmits (or optically transmits) the signal $\lambda$1-A from an upstream output terminal of the wavelength-converting subunit Ax to a downstream input terminal of the corresponding wavelength interface subunit Bx (step S23).

The first encoder/modulator part 123 of the relevant wavelength interface subunit Bx generates channel position information by forming either one of the two types of coded signals from the received signal. Th channel position information is transmitted to the MUX/DEMUX 130 (step S24).

The $\lambda$-analyzer 140 measures the wavelength $\lambda$ of the received signal (step S25).

The control part 121 of the wavelength interface unit 120 receives the measured $\lambda$-information from the $\lambda$-analyzer 140 and stores it in a variable "lambda_measured". Also, the control part 121 reads out the channel position information (modulated information) of the measured wavelength $\lambda$ (step S26).

Further, the control part 121 makes an access to a $\lambda$-information storage part 126 of the corresponding channel part Bx and retrieves information indicating the wavelength $\lambda$ that corresponds to the channel indicated by the channel position information read out in step S25. The retrieved wavelength is stored as a variable "lambda_temp2". Then, it is determined whether there is a match between the $\lambda$-information obtained in step S25 and the $\lambda$-information obtained in step S26 (steps S29 and S30). In detail, in step S29, a predetermined allowable range λ is added to the measured λ-information "lambda_measured", as follows:

lambda_*s*=lambda_measured×(1−*k*)

lambda_*l*=lambda_measured×(1+*k*).

Then, in step S30, it is determined whether the λ-information lambda_temp2 that is unique to the wavelength interface subunit Bx read from the wavelength interface subunit Bx is within the allowable range. That is to say, it is determined whether:

lambda_s<lambda_temp2, and, lambda_temp2<lambda_l.

The control part 121 of the wavelength I/F unit 120 sends either an OK notification request or a NG notification request depending on the value of lambda_temp2 and the timeout condition.

If lambda_temp2 is within allowable range (step S30, YES), the control part 121 sends an OK notification request to the second encoder/modulator part 124 of the relevant wavelength interface subunit Bx (step S33). Also, a halt request is sent to the first encoder/modulator part 123 of the relevant wavelength interface subunit Bx (step S32).

If lambda_temp2 is not within the allowable range (step S30, NO) or a predetermined period of time has elapsed after initiating a data output operation from the downstream input terminal of the relevant wavelength interface subunit Bx (step S27, YES), an NG notification request is sent to the second encoder/modulator part 124 of the relevant wavelength interface subunit Bx (step S31).

Then, the second encoder/modulator part 124 generates either an OK signal or an NG signal (see FIG. 9) depending on the OK/NG notification request generated in steps S31 and S31. The generated OK signal or NG signal is transmitted from the downstream output terminal of the relevant wavelength interface subunit Bx to the upstream input terminal of the corresponding wavelength-converting subunit Ax (step S34).

Upon reception of an OK signal at wavelength-converting subunit Ax (step S35, OK), the data processing part 112 of the wavelength-converting subunit Ax sets the currently output wavelength value λ to its transmitter part as a conversion wavelength (step S36).

Upon reception of an NG signal at the wavelength-converting subunit Ax (step S35, NG), the data processing part 112 of the wavelength-converting subunit Ax sends a resetting request to the control part 111. In response, the control part 111 reselects a new wavelength λ from the first storage part 113 and rewrites the variable lambda_temp with the reselected wavelength λ (step S22). The lambda_temp information is transmitted to the corresponding wavelength interface subunit Bx (step S23). In this manner, steps S22 through S35 are repeated until the value of the wavelength to be set λ is determined.

Steps S21 through S36 are repeated for a number of times corresponding to the predetermined number of channels.

It is to be noted that, according to this embodiment, the operation may be performed while signals are being transmitted through other channels. In such a case, the control part 121 controls the encoder/modulator 123 of the wavelength I/F part Bx to modulate a particular wavelength using ON/OFF states. The modulated particular wavelength may be specified by an analysis at the λ-analyzer 140.

Figure 8:
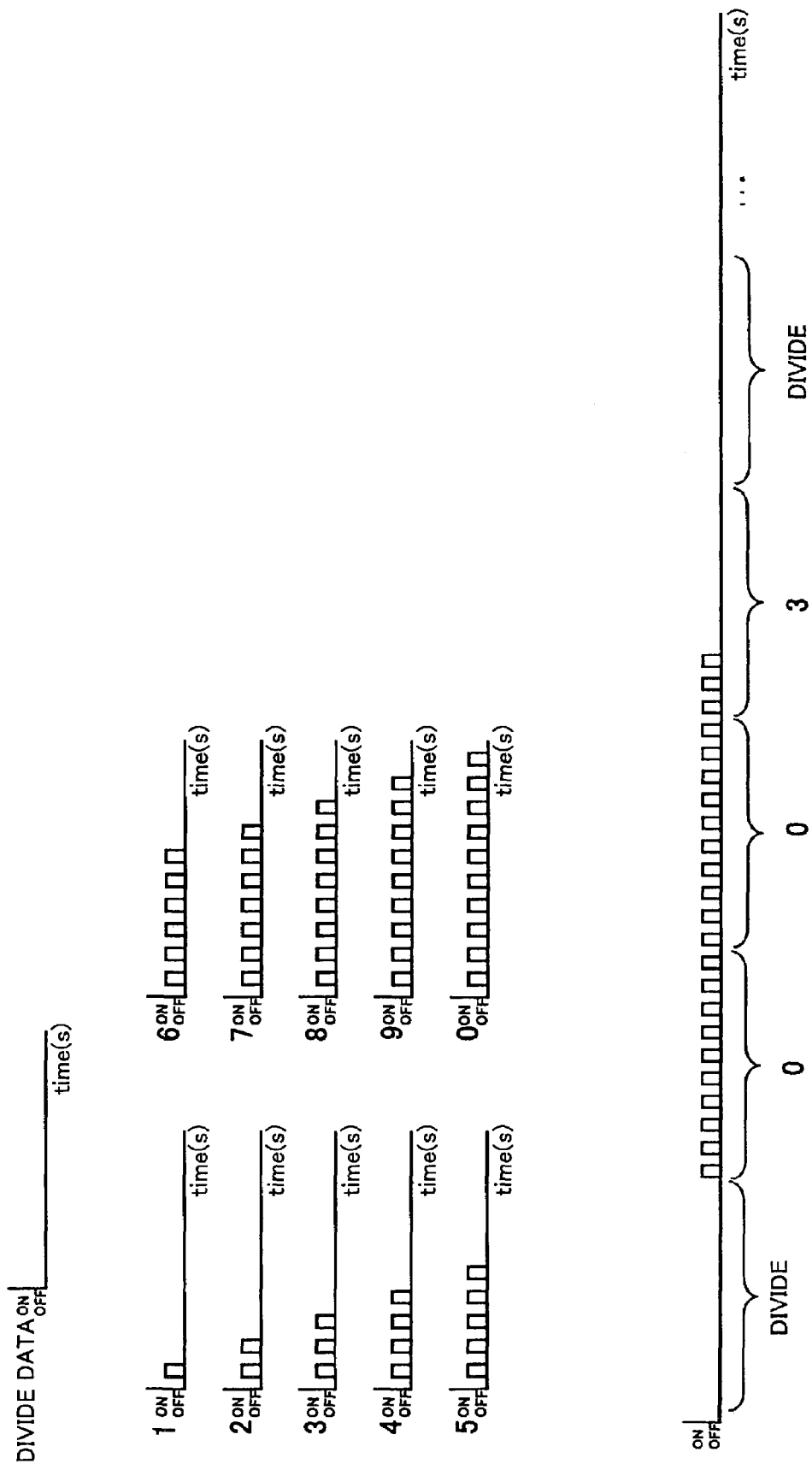
FIG. 8 is a diagram showing time-charts of an example of a mode of modulation of optical signals that can be applied to the WDM device of the first embodiment of the present invention.

FIG. 8 is a diagram showing an example of the channel position information. In this case, modulation using ON/OFF states is performed using number of pulses within a predetermined length of time period. For example, in order to express a channel position (channel number) three, pulsed codes indicating "0", "0", and "3" are generated in a sequential manner.

Figure 9:
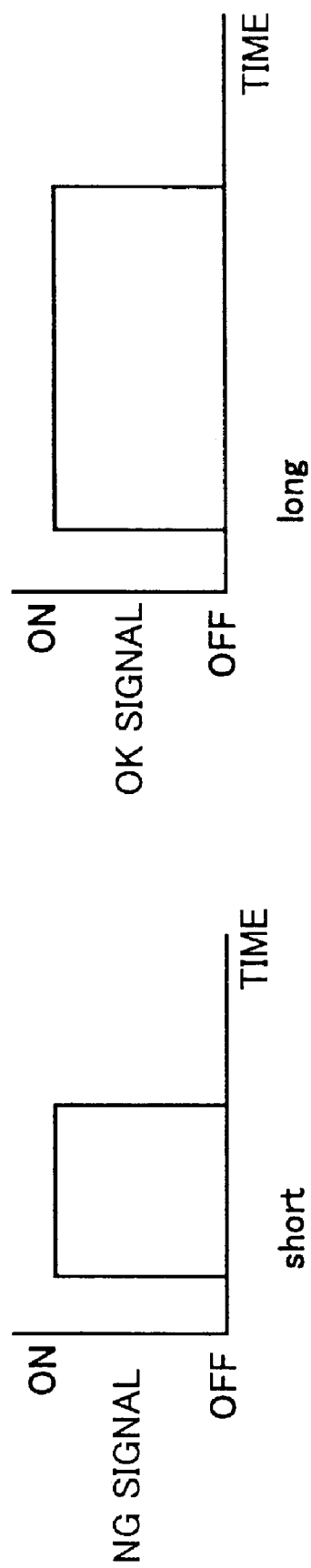
FIG. 9 is a diagram showing time-charts of an example of another mode of modulation of optical signals that can be applied to the WDM device of the first embodiment of the present invention.

FIG. 9 is a diagram showing an example of the OK/NG signal. In the example illustrated in the figure, an OK signal is represented by a pulse having a longer period for an ON state and an NG signal is represented by a pulse having a shorter period for an ON state.

A second embodiment of the present invention will be described below.

Figure 10:
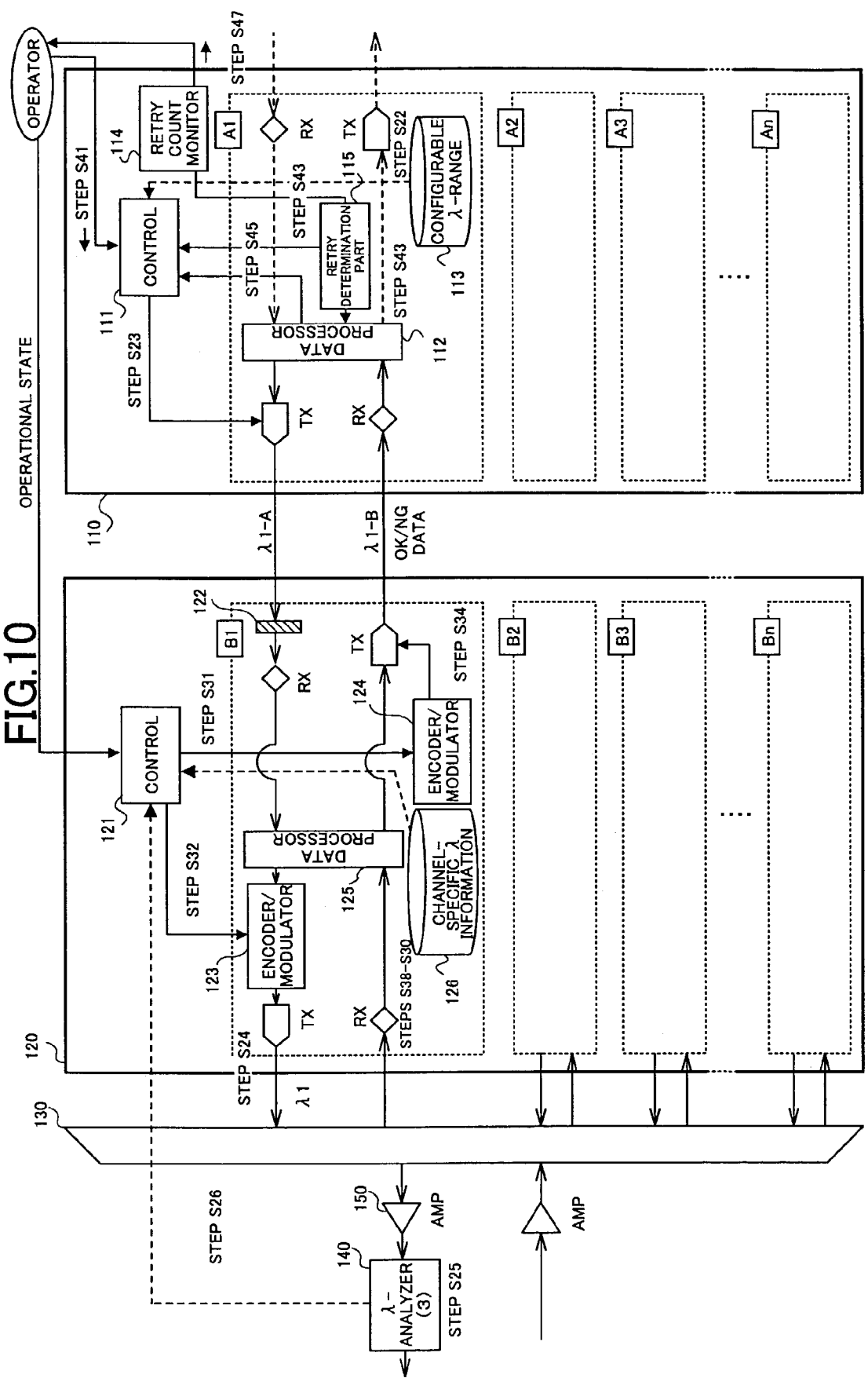
FIG. 10 is a block diagram showing a WDM device of a second embodiment of the present invention.
Figure 11:
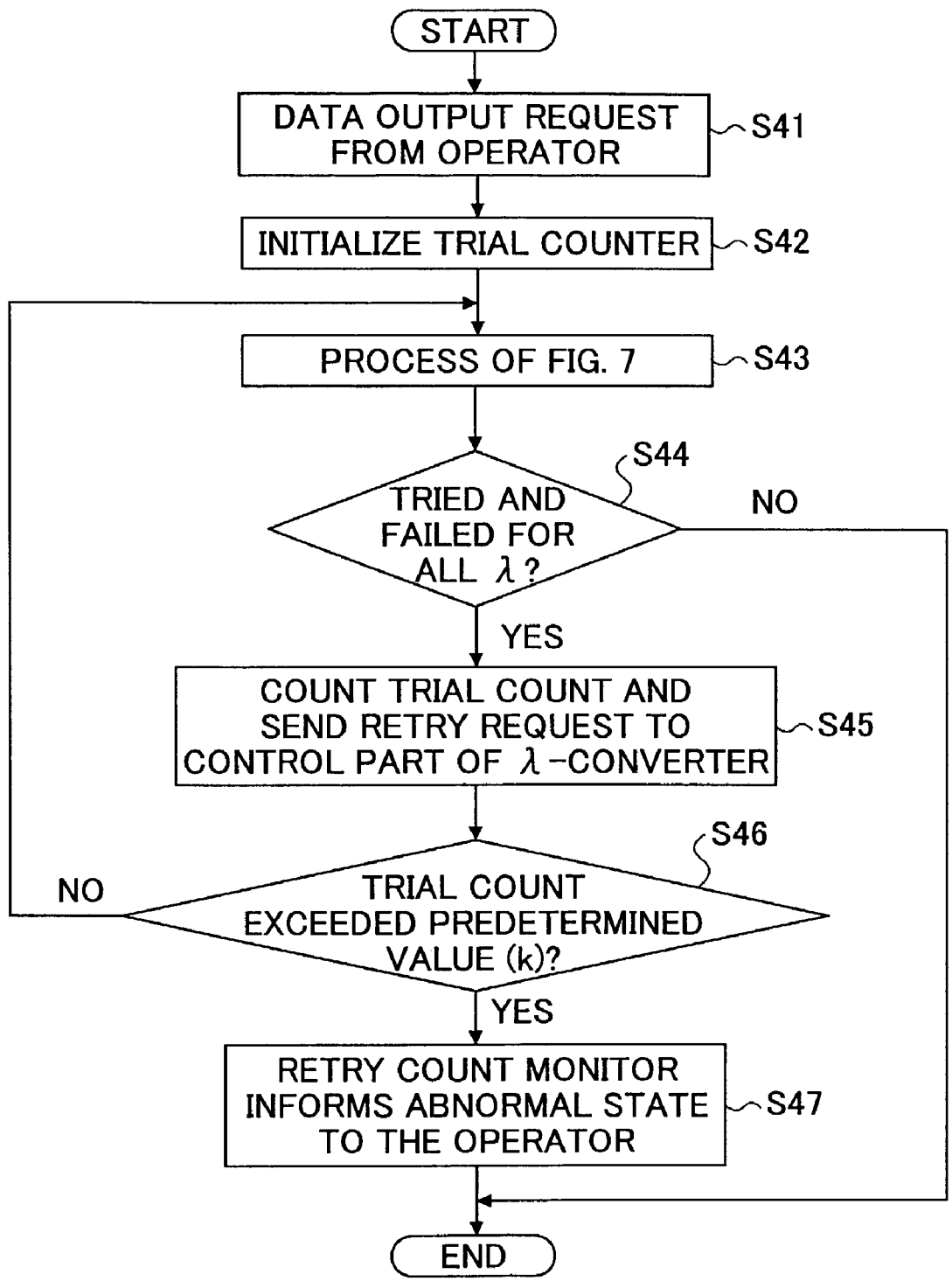
FIG. 11 is a flowchart showing process steps of an operation of a WDM device of the second embodiment of the present invention.

FIG. 10 is a diagram showing a WDM device of the second embodiment of the present invention. In this embodiment, as shown in the figure, the wavelength-converting unit 110 is further provided with a retry count monitoring part 114. A retry determination part 115 is provided in each of the wavelength-converting subunits Ax. An operation of the second embodiment will be described with reference to the flowchart shown in FIG. 11.

It is to be noted that operational requirements of the second embodiment are the same as those of the first embodiment.

In a similar manner to the first embodiment, the operator inputs a DATA output request to the control part 111 of the wavelength-converting unit 110 (step S41). Then, a trial counter (retry_count) is initialized (step S42).

Figure 7:
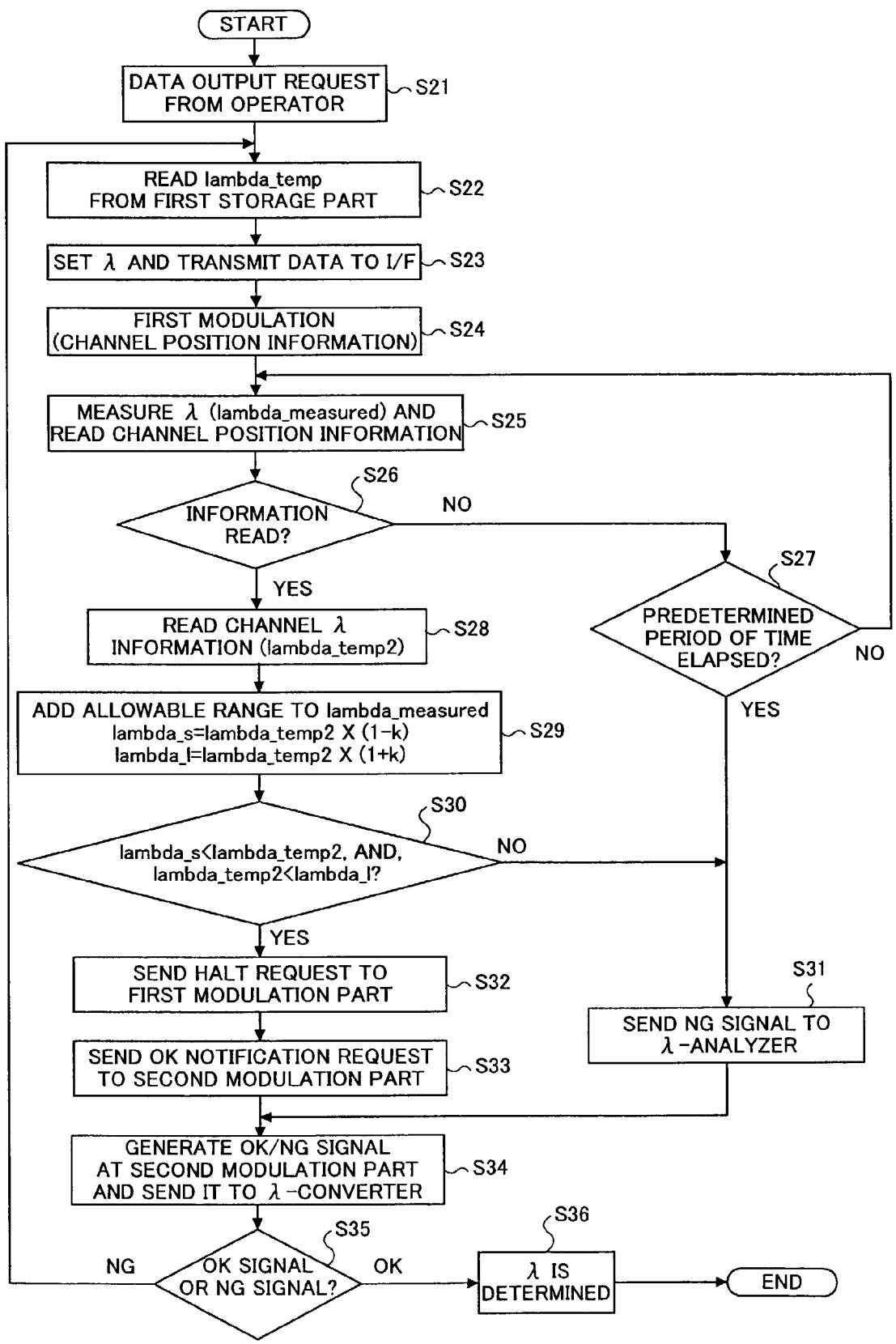
FIG. 7 is a flowchart showing process steps of an operation of a WDM device of the first embodiment of the present invention.

Thereafter, while performing the process of FIG. 7, the retry determination part 115 of the wavelength-converting subunit Ax monitors the data-processing part 112. If the process of FIG. 7 (steps S22 through S35) has failed for all the available wavelengths λ (step S44, YES), the trial counter is incremented and a retry request is sent to the control part 111 (step S45).

The control part 111 returns to the process shown in FIG. 7, selects one of the wavelength λ from the first storage part 113 (step S22), and repeats the remaining process steps (steps S22 through S35).

The retry count monitoring part 114 monitors the retry determination part 115. When the trial counter exceeds a predetermined value k (retry_count>k), the operator is informed that automatic setting has failed, or, there is an abnormality. Such failure information contains information items such as the channel number and a cause of failure, e.g., "no wavelength λ is available for setting" (step S47). Then, the process is terminated.

It is to be noted that if data transmission of a signal having a wavelength λ from the upstream output terminal of the wavelength-converting subunit Ax to the downstream input terminal of the wavelength interface subunit Bx has failed for some reason, even in a case where the signal is of a wavelength λ to be set, the wavelength interface unit 120 will determine that the wavelength λ cannot be set. Therefore, even if it is determined that all the wavelengths λ cannot be set, it is worth retrying.

A third embodiment of the present invention will be described below.

Figure 12:
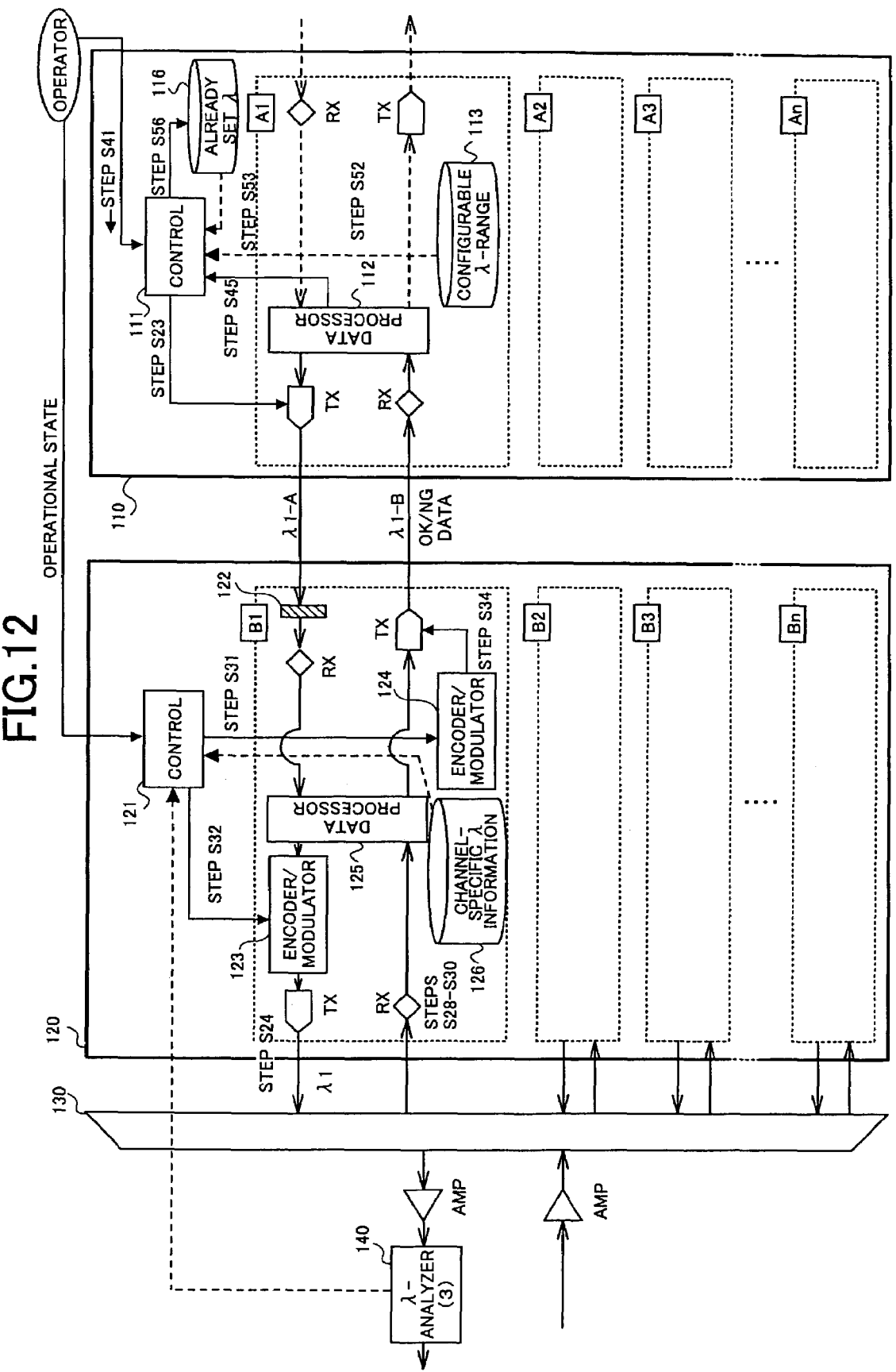
FIG. 12 is a block diagram showing a WDM device of a third embodiment of the present invention.
Figure 13:
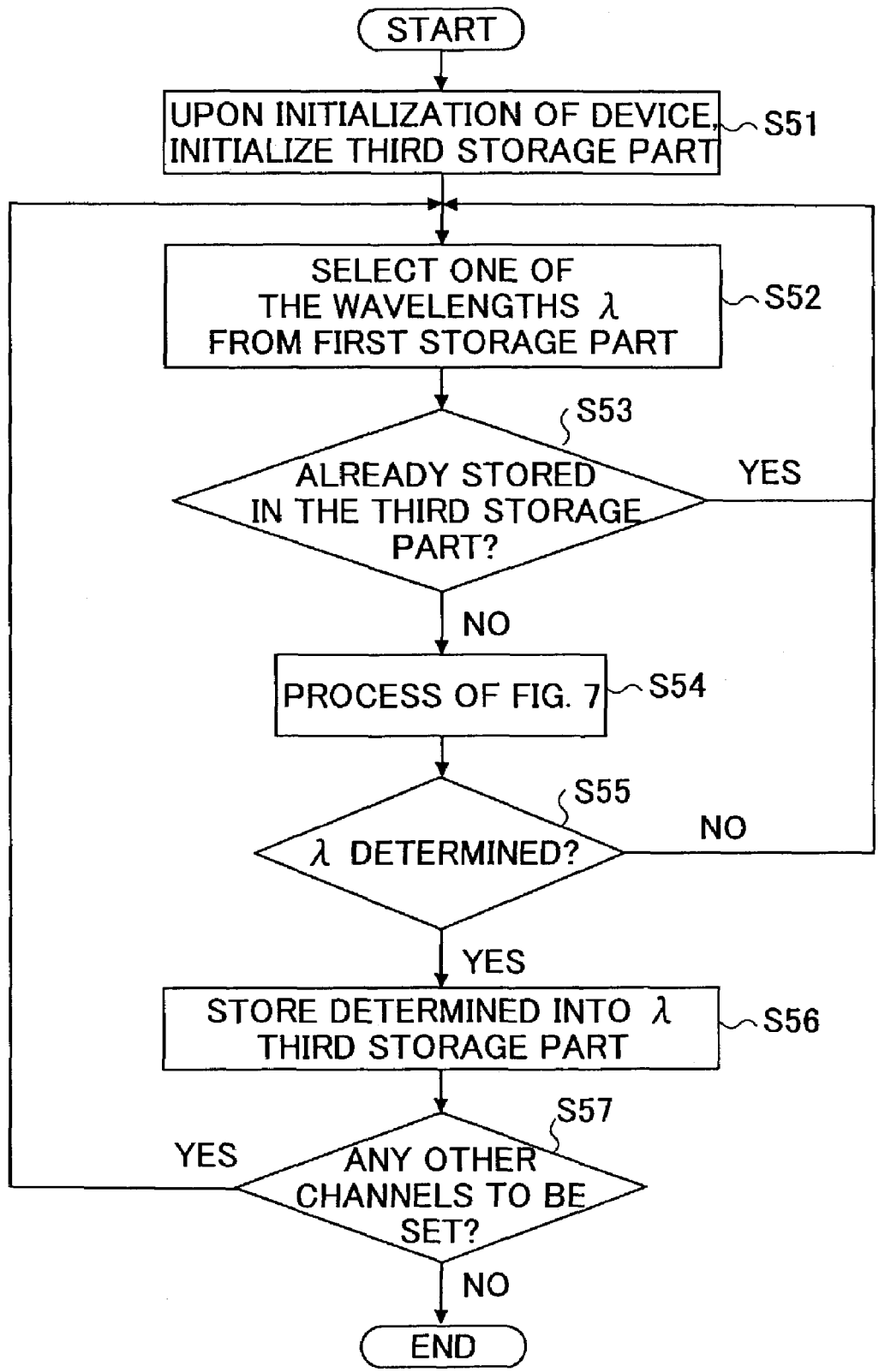
FIG. 13 is a flowchart showing process steps of an operation of a WDM device of the third embodiment of the present invention.

FIG. 12 is a diagram showing a WDM device of the third embodiment of the present invention. In this embodiment, as shown in the figure, the wavelength-converting unit 110 is further provided with a third storage part 116 for storing wavelengths λ that has already been set. An operation of the second embodiment will be described with reference to the flowchart shown in FIG. 11. An operation of this embodiment will be described with reference a flowchart shown in FIG. 13.

It is to be noted that operational requirements of the third embodiment are the same as those of the first embodiment.

Upon initializing the wavelength-converting unit 110, a third storage part 116 is initialized (step S51).

At the wavelength-converting subunit Ax, a relevant wavelength λx is automatically determined in accordance with the process shown in FIG. 7 (steps S52 through S55).

The determined wavelength λx is stored in the third storage part (step S56).

Upon setting wavelength λ for the next wavelength-converting subunit Ax+1, when selecting one of the wavelengths λ from the first storage part 113, it is determined whether the selected wavelength λ has already been stored in the third storage part (step S53).

If in step S53, it is determined that the selected wavelength λ is stored in the third storage part 116, the process of FIG. 7 is performed for the selected wavelength.

If in step S53, it is determined that the selected wavelength λ has already been stored in the third storage part 116, the selected wavelength λ is discarded and a new wavelength λ is selected from the first storage part 113. Then, the processes of steps S53 through S55 are repeated.

According to such an embodiment, it is possible to prevent any retry operations for the "already set wavelength λ" for other channels in a simple manner. Accordingly, the process can be performed efficiently.

A fourth embodiment of the present invention will be described with reference to FIGS. 14, 15, 16 and 17.

FIG. 14 is a block diagram showing a fourth embodiment of the present invention and FIGS. 15 through 17 are diagram showing time charts of encoded signals (modulated signals) that can be used in the fourth embodiment.

Requirements for the fourth embodiment are that the wavelength-converting and wavelength interface units 110 and 120 are in an operable state, that the wavelength-converting and wavelength interface units 110 and 120 are in a mutually opposed state, and that data transmission from the wavelength interface unit 120 to the wavelength-converting unit 110 may be stopped.

According to the fourth embodiment, an optical signal modulation is performed on the channel-specific λ-information of the wavelength I/F subunit Bx. The modulated channel-specific λ-information is transmitted from the wavelength interface subunit Bx of the wavelength interface unit 120 to the wavelength-converting subunit Ax of the wavelength-converting unit 110. The wavelength-converting subunit Ax sets the wavelength λ using the transmitted λ-information. This operation will be described in detail.

First, the operator inputs to the wavelength interface subunit Bx a request for changing from an idle state to an operational state. The request may include parameters such as device name, channel name and state of operation. This is analyzed at the control part 121 of the wavelength interface unit 120. In response, a λ-setting request is sent to a third encoder/modulator part 127. Then, the third encoder/modulator part 127 reads the channel-specific λ-information of the relevant wavelength interface subunit Bx.

Then, the third encoder/modulator part 127 controls ON/OFF states of a downstream transmitter part TX of the wavelength interface subunit Bx to generate and transmit START DATA. Then, the third encoder/modulator part 127 performs encoding modulation (see FIGS. 16 and 17) of intensity of an optical signal of wavelength λ (e.g., 1528.77) that has been read from the second information storage part 126. In this manner, λ-information is generated. The START DATA and the λ-information data serve as follows. These data are generated by controlling the intensity of an optical signal to produce ON (signal continued) state and an OFF (signal intermitted) state (see FIG. 15A) such that codes can be expressed by combinations of the ON/OFF states. As a variant, it is also possible to generate a LONG state and a SHORT state by controlling the period of the high-state of the light intensity and to express codes with combinations of the LONG and SHORT states (see FIG. 17).

Then, the λ-information data is transmitted to the upstream receiver part RX of the wavelength-converting subunit Ax. After the transmission process of the λ-information, the third encoder/modulator part 127 controls ON/OFF states of the downstream transmitter part TX of the wavelength interface subunit Bx so as to produce and transmit a predetermined END DATA (see FIGS. 16 and 17).

The upstream receiver part RX of the corresponding wavelength-converting subunit Ax receives the λ-information data. In the data processing part 112, the λ-information is read out from the received λ-information data. The λ-information is sent to the control part 111. The control part 111 looks up the first storage part 113 to determine whether the received λ-information is within the range of wavelength λ that can be set. If a matching wavelength λ exists in the first storage part 113, the -information is set to the downstream transmitter part TX of the wavelength-converting subunit Ax and the operator is informed of completion of the setting operation. If there is no matching wavelength λ in the first storage part 113, the control part 111 informs the operator that the wavelength-setting operation has failed.

A fifth embodiment of the present invention will be described with reference to FIGS. 18 through 23. In the above-mentioned fourth embodiment, the optical signal is intensity modulated by controlling ON/OFF states and therefore the optical signal is disconnected in the OFF state. The fifth embodiment is similar to the fourth embodiment except that encoding/modulation of a type that does not use an OFF state is performed. That is to say, the intensity of the optical signal is changed to such an extent that data contained in the optical signal is not lost. Thus, the encoded and modulated signal for transferring λ-information can be generated without disconnecting the optical signal or without losing data that were originally contained in the optical signal.

In this embodiment, the λ-information data are generated by controlling the light intensity levels of the optical signal between two levels, such as between Middle and High or between Middle and Low. Further, the λ-information data may be generated by controlling the light intensity levels of the optical signal between three levels, such as Middle, High and Low. Then, the generated λ-information data are transmitted from the wavelength interface subunit Bx to the wavelength-converting subunit Ax. To this end, each of the wavelength interface subunits Bx is provided with an output level controlling part (OLC) 128 and the corresponding wavelength-converting subunit Ax is provided with an input level detecting part (ILD) 117. The input level detecting part 117 detects the Middle and Low levels, Middle and High levels, or, Middle, Low and High levels to obtain the λ-information.

Requirements for the fifth embodiment are that the wavelength-converting and wavelength interface units 110 and 120 are in their operational state and that the wavelength-converting unit 110 and the wavelength interface unit 120 are arranged so as to oppose each other.

The fifth embodiment differs from the fourth embodiment in that START DATA, END DATA and the λ-information data are not encoded and modulated in a manner illustrated in FIGS. 15 through 17, but instead encoded and modulated (without signal disconnections) as shown in FIG. 19 or 20A and 20B, and FIGS. 21, 22, or 23.

In an example shown in FIG. 19, two levels of optical signal, i.e., Middle and Low, or, Middle and High, are used. FIG. 21 shows an example of an encoding/modulation pattern using the Middle and Low levels. In an example shown in FIG. 20A, three levels of optical signal, i.e., Middle, Low and High, are used. FIG. 22 shows an example of an encoding/modulation pattern using the three levels of optical signal.

Figure 20A:
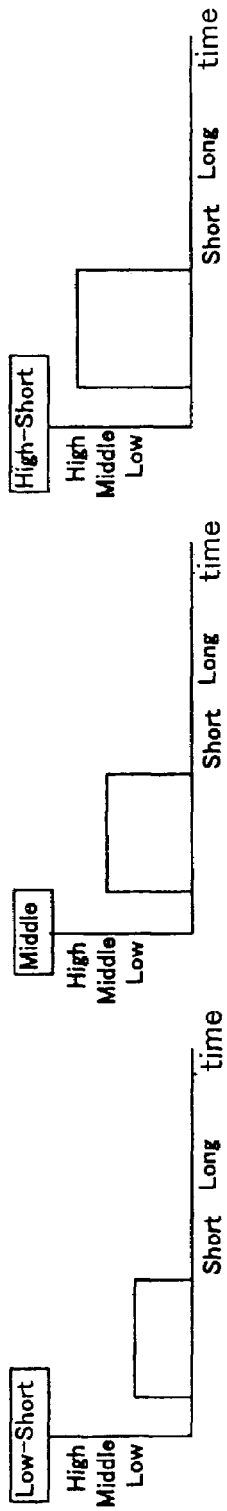
FIGS. 20A and 20B are diagrams showing time-charts of examples of other modes of modulation of optical signals that can be applied to the WDM device of the fifth embodiment of the present invention.
Figure 20B:
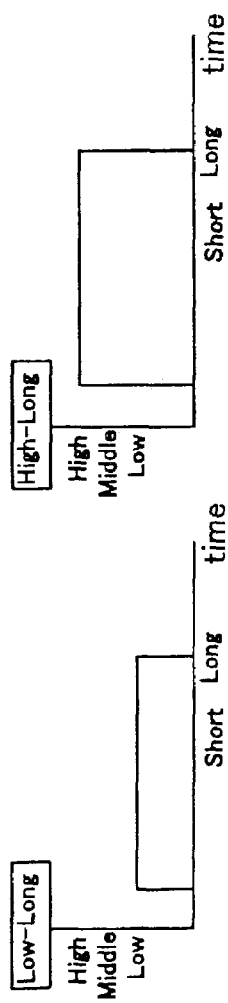

FIG. 20B shows an example in which encoding and modulation is performed for an intensity of light and a duration of a particular intensity. FIG. 23 shows an example of an encoding/modulation pattern for such a case. In detail, for the example shown in FIG. 23, Middle level and four values, i.e., High-Short, High-Long, Low-Short and Low-Long are used.

Figure 24:
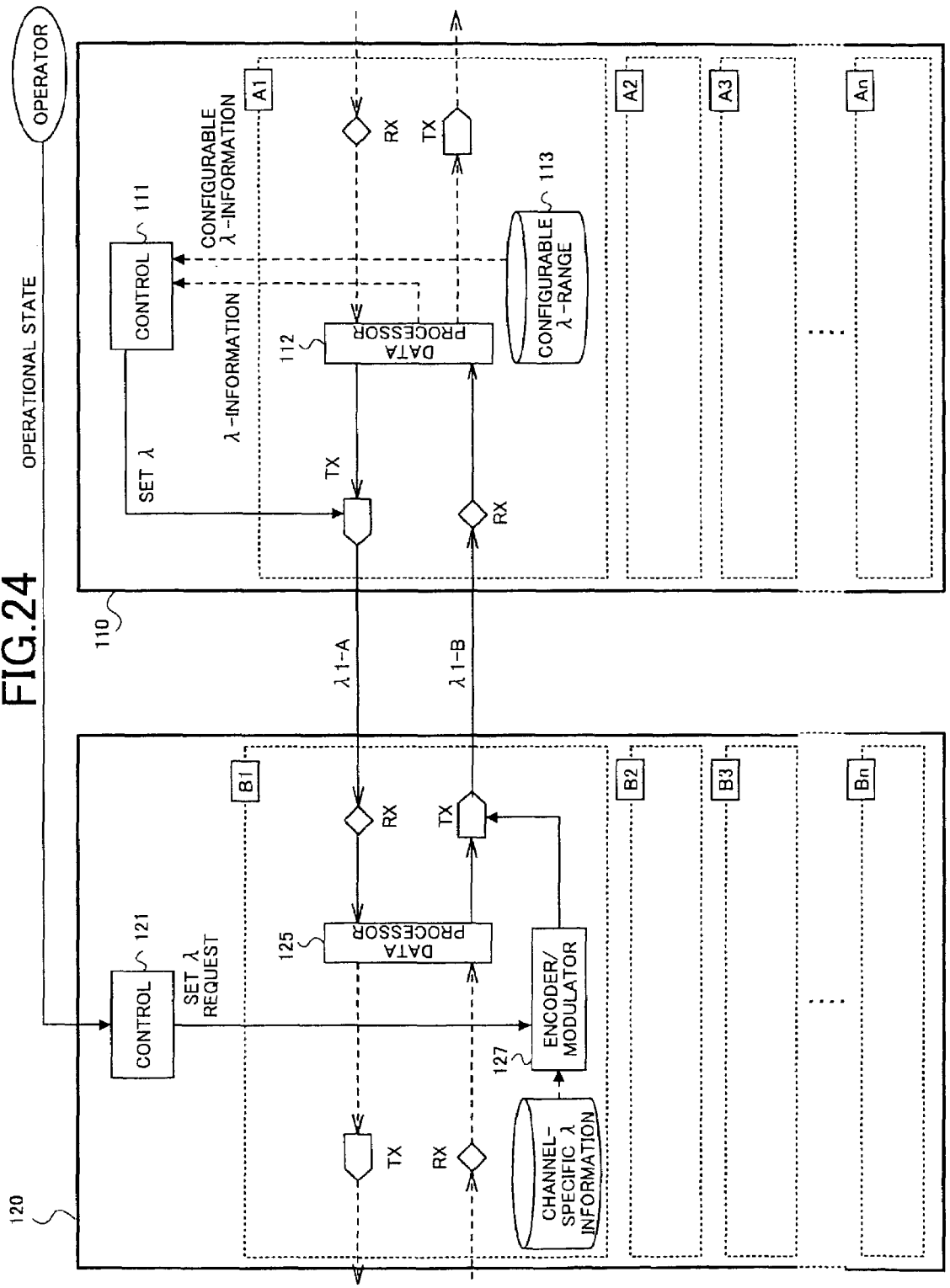
FIG. 24 is a block diagram showing a WDM device of a sixth embodiment of the present invention.
Figure 25:
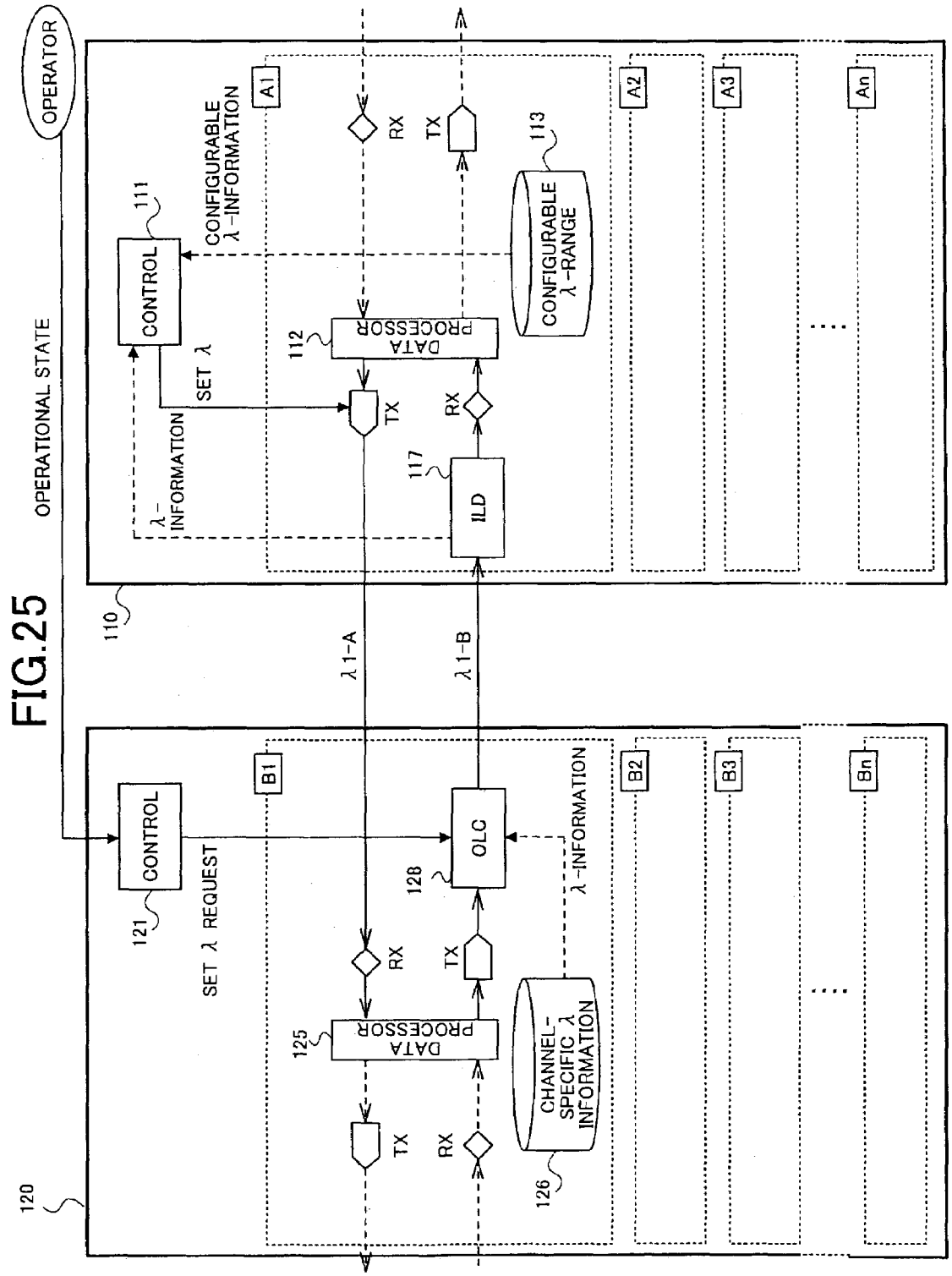
FIG. 25 is a block diagram showing a WDM device of a variant of the sixth embodiment of the present invention.

A sixth embodiment of the present invention will be described with reference to FIGS. 24 and 25. Conventionally, the wavelength interface unit 120 has an idle state to prevent it from being unintentionally operated. During the idle state, no data are output. When the operator inputs an instruction to change into an operational state, the wavelength interface unit 120 starts outputting data.

Figure 18:
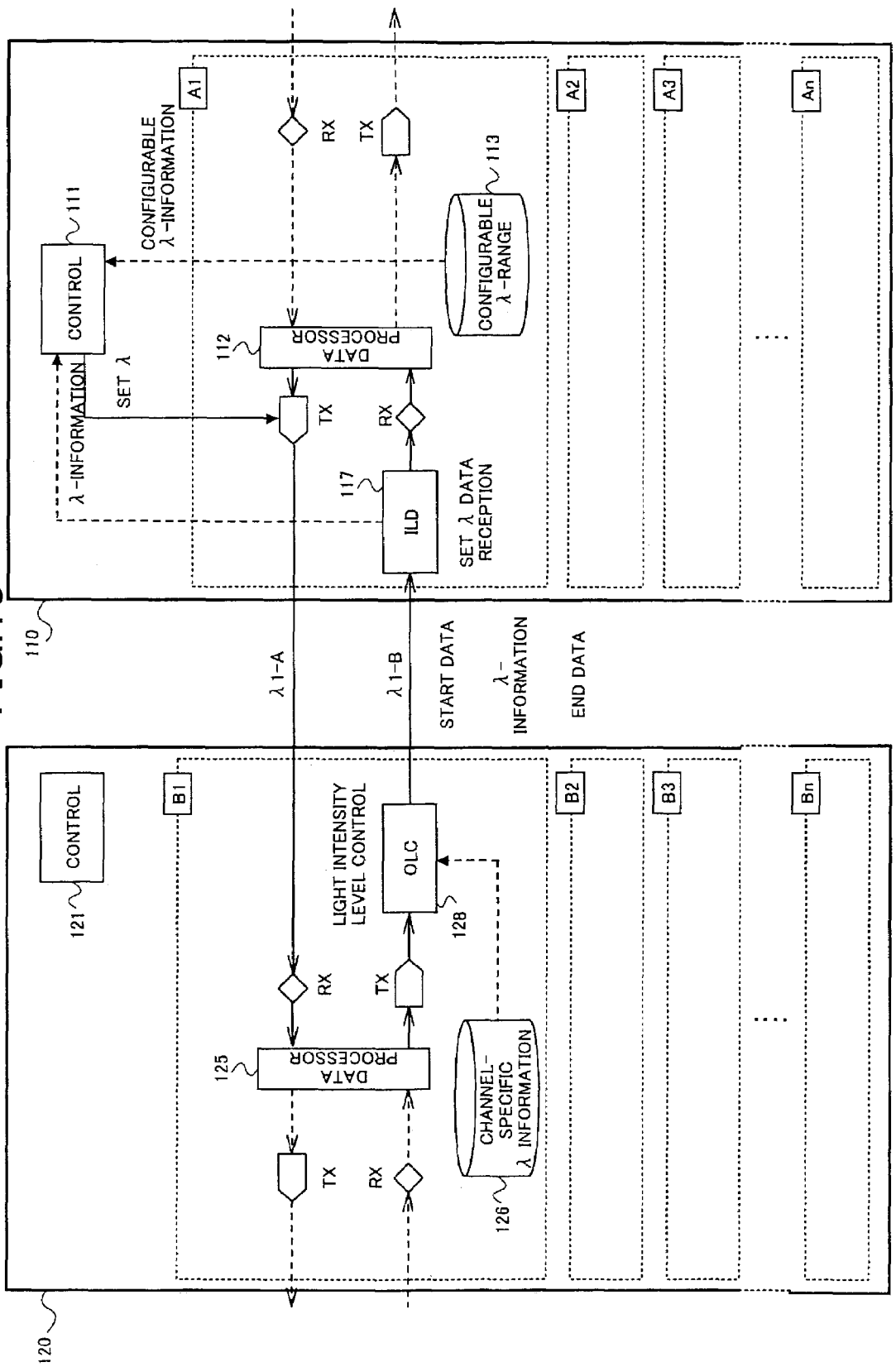
FIG. 18 is a block diagram showing a WDM device of a fifth embodiment of the present invention.

The present embodiment relates to an operation in which, for the fourth and fifth embodiments described with reference to FIGS. 14 and 18, the operator inputs an instruction into the wavelength interface unit 120 for changing the wavelength interface unit Bx from the idle state to the operational state so as to start the λ-setting processes. In other words, in response to an instruction from the operator, the control part 121 controls the third encoder/modulator part 127 or the output level controlling part 128 such that the optical signal is encoded and modulated to transmit the λ-information the wavelength-converting subunit Ax of the wavelength-converting unit A. Thereafter, the λ-setting operation is performed in a manner similar to the above-mentioned fourth and fifth embodiments.

Figure 26:
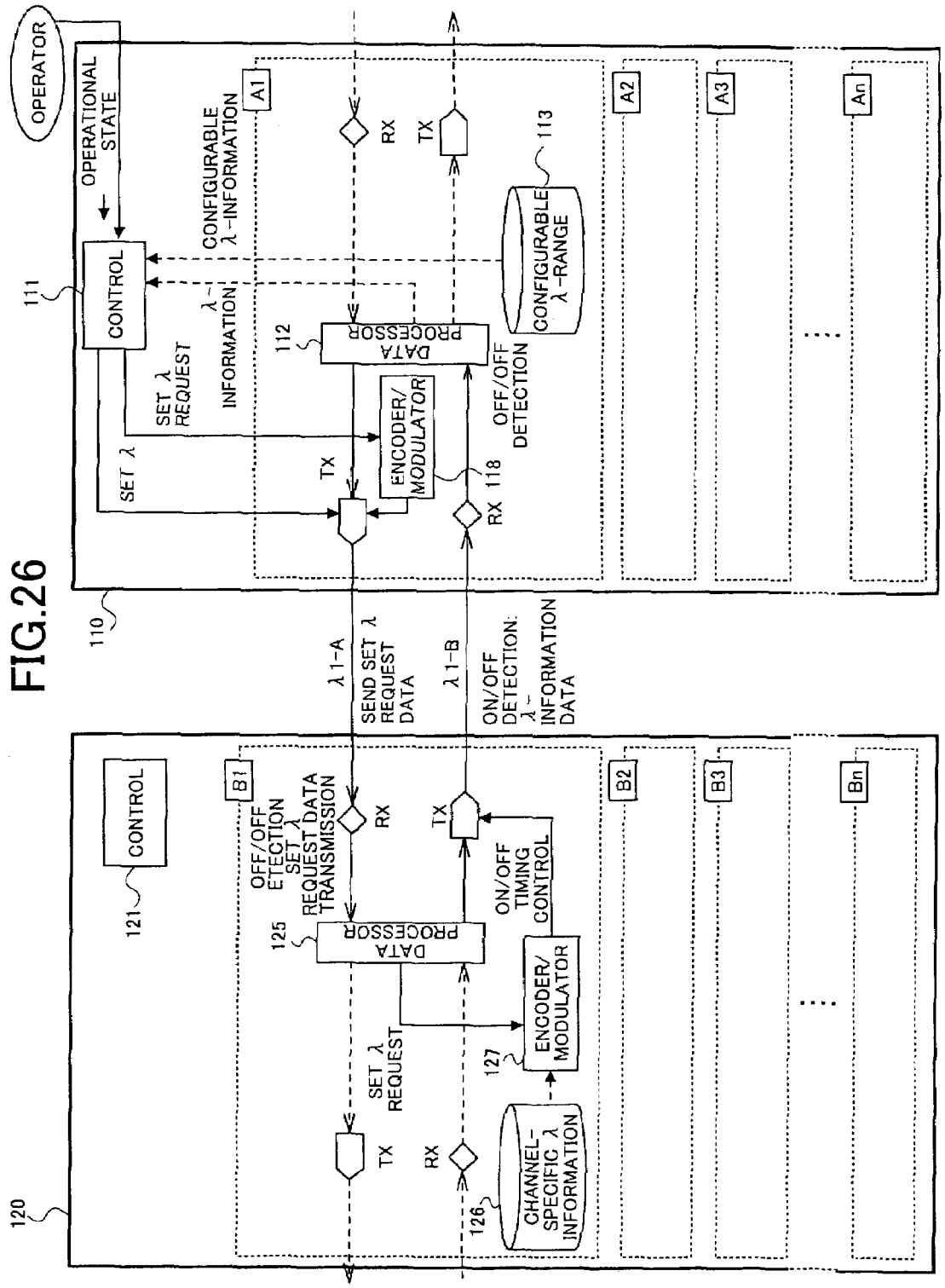
FIG. 26 is a block diagram showing a WDM device of a seventh embodiment of the present invention.
Figure 27:
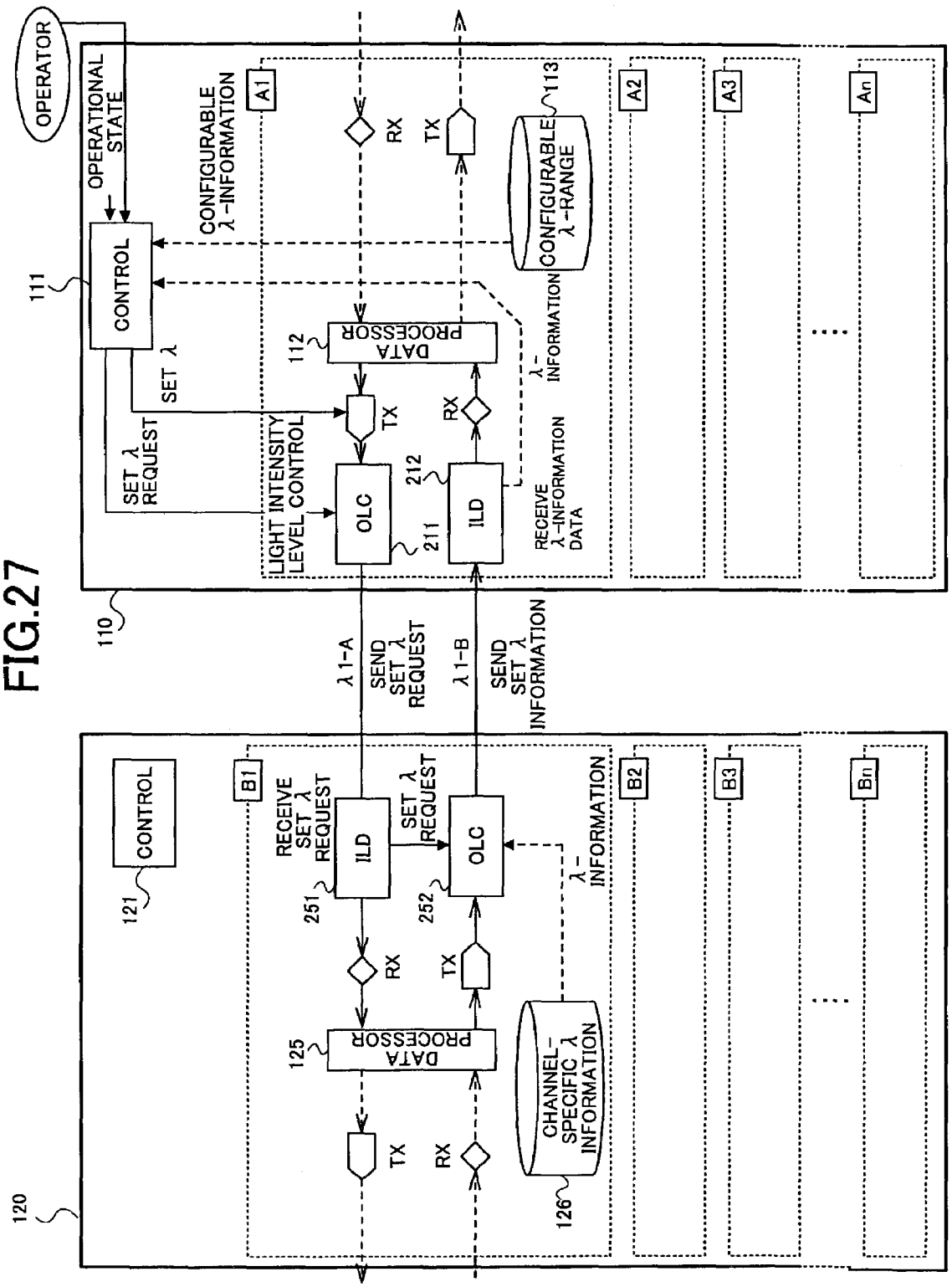
FIG. 27 is a block diagram showing a WDM device of a variant of the seventh embodiment of the present invention.

A seventh embodiment of the present invention will be described with reference to FIGS. 26 and 27. In the above-described sixth embodiment, an instruction for changing from the idle state to the operational state is made to the wavelength interface unit 120. Whereas, according to the seventh embodiment, such an instruction is made to the wavelength-converting unit 110. FIG. 26 shows a variant of the seventh embodiment in which a fourth encoder/modulator part 118 is provided in the wavelength-converting subunit Ax of the wavelength-converting unit 110 shown in FIG. 14. FIG. 27 shows a variant of the seventh embodiment in which an output level controlling part 211 is provided in the wavelength-converting unit 110 and an input level controlling part 251 is provided in the wavelength interface unit 120.

An operation of the seventh embodiment will be described in detail.

First, the variant of the seventh embodiment shown in FIG. 26, which corresponds to the fourth embodiment, will be described. The operator inputs a request (parameters: device name, channel name and operational state) for the wavelength-converting subunit Ax to change from an idle state to an operational state. The control part 111 analyses the request and controls the ON/OFF states of the optical signal at the encoder/modulator part 127 so as to transmit a λ-setting request data. The wavelength interface subunit Bx of the wavelength interface unit 120 receives and decodes/demodulates the setting request data and obtains the relevant λ-setting instruction. Then, the wavelength interface subunit Bx reads the λ-information from the λ-information storage part 126 and controls the encoder/modulator part 127 so as to modulate the optical signal using the ON/OFF states to produce the START DATA and the λ-information. Then, the START DATA and the λ-information are transmitted to the wavelength-converting subunit Ax of the wavelength-converting unit 110. Thereafter, a λ-setting operation is performed in a manner similar to the fourth embodiment.

Next, another variant of the seventh embodiment shown in FIG. 27, which corresponds to the fifth embodiment, will be described. The operator inputs a request (parameters: device name, channel name and operational state) for the wavelength-converting subunit Ax to change from an idle state to an operational state. The control part 111 analyses the request and intensity modulates the optical signal at the output level controlling part 211 so as to transmit a λ-setting request data. The wavelength interface subunit Bx of the wavelength interface unit 120 receives and demodulates the setting request data at the input level detecting part 251 and obtains the relevant λ-setting instruction. Then, the wavelength interface subunit Bx reads the λ-information from the λ-information storage part 126 and controls the output level controlling part 252 so as to intensity modulate the optical signal to produce the START DATA and the λ-information. Then, the START DATA and the λ-information are transmitted to the wavelength-converting subunit Ax of the wavelength-converting unit 110. Thereafter, a λ-setting operation is performed in a manner similar to the fifth embodiment.

An eighth embodiment of the present invention will be described below with reference to FIGS. 28 and 29.

First, a variant of the eighth embodiment shown in FIG. 28, which corresponds to the embodiment shown in FIG. 14, will be described. The wavelength interface subunit Bx of the wavelength interface unit 120 is further provided with a transmitter part 253 for transmitting λ-information data and the corresponding wavelength-converting subunit Ax of the wavelength-converting unit 110 is provided with a receiver part 213 for receiving the λ-information data. Further, a coupler/decoupler 214 made of optical couplers is provided on an upstream side of the wavelength-converting subunit Ax so as to decouple the signal that is input from the wavelength interface subunit Bx and couple the signal that is output to the wavelength interface subunit Bx. Also, a coupler/decoupler 254 made of optical couplers is provided on a downstream side of the wavelength interface subunit Bx so as to decouple the signal that is input from the wavelength-converting subunit Ax and couple the signal that is output to the wavelength-converting subunit Ax.

Further, in order to generate λ-setting request data and send the data from the wavelength-converting subunit Ax to the wavelength interface subunit Bx, the wavelength-converting subunit Ax is further provided with an encoder/modulator part 215. Also, in order to generate λ-information data and send the data from the wavelength interface subunit Bx to the wavelength-converting subunit Ax, the wavelength interface subunit Bx is further provided with an encoder/modulator part 255. Further, in order to detect the λ-information data from the wavelength interface subunit Bx and obtain the λ-information, the wavelength-converting subunit Ax is further provided with an encoder/modulator part 216.

Next, another variant of the eighth embodiment shown in FIG. 29, which corresponds to the embodiment shown in FIG. 18, will be described. In a manner similar to the example shown in FIG. 28, a transmitter part 253 for transmitting the λ-setting request data is provided in the wavelength interface subunit Bx and a receiver part 213 for receiving the λ-setting request data is provided in the wavelength-converting subunit Ax. Further, a coupler/decoupler 214 made of optical couplers is provided on an upstream side of the wavelength-converting subunit Ax so as to decouple the signal that is input from the wavelength interface subunit Bx and couple the signal that is output to the wavelength interface subunit Bx. Also, a coupler/decoupler 254 made of optical couplers is provided on an downstream side of the wavelength interface subunit Bx so as to decouple the signal that is input from the wavelength-converting subunit Ax and couple the signal that is output to the wavelength-converting subunit Ax.

The wavelength-converting subunit Ax is further provided with an output level controlling part 217 for generating and transmitting λ-setting request data from the wavelength-converting subunit Ax to the wavelength interface subunit Bx. The wavelength interface subunit Bx is further provided with an input level detecting part 256 for detecting the λ-setting request data from the wavelength-converting subunit Ax and to obtain the λ-setting request. Further, the wavelength interface subunit Bx is provided with an output level controlling part 257 for generating and transmitting λ-information data from the wavelength interface subunit Bx to the wavelength-converting subunit Ax. Also, the wavelength-converting subunit Ax is provided with an input level detecting part 218 for detecting the λ-information data from the wavelength interface subunit Bx and to obtain the λ-information.

In the present invention, a requirement is that a signal λx-A (a signal having a wavelength from the wavelength-converting unit 110 to the wavelength interface unit 120) may assume a non-communicating state until the automatic λ-setting operation is completed.

In the present embodiment, the wavelength λx-A of an output signal to the upstream direction is automatically set in a manner described below.

Figure 28:
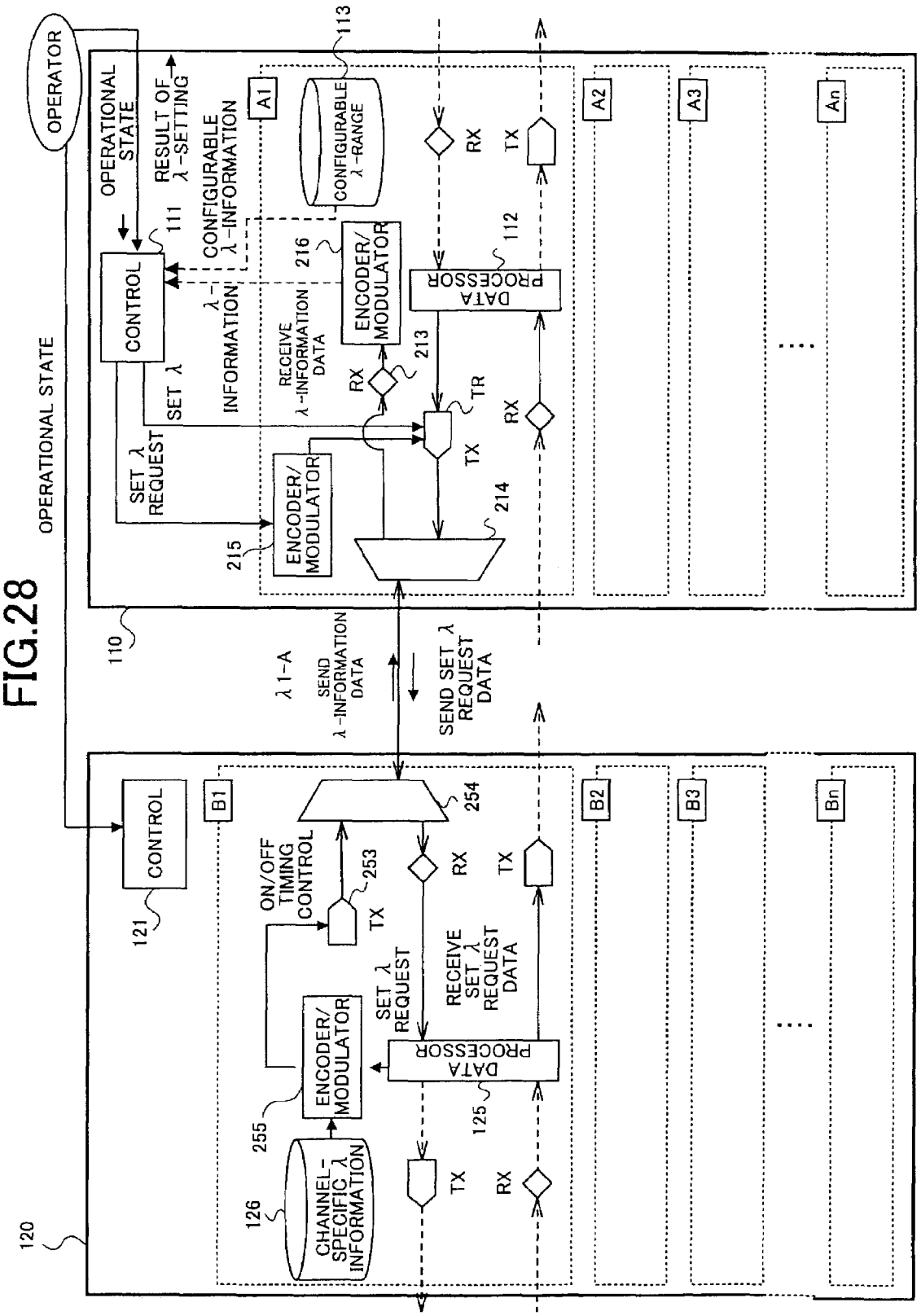
FIG. 28 is a block diagram showing a WDM device of an eighth embodiment of the present invention.
Figure 29:
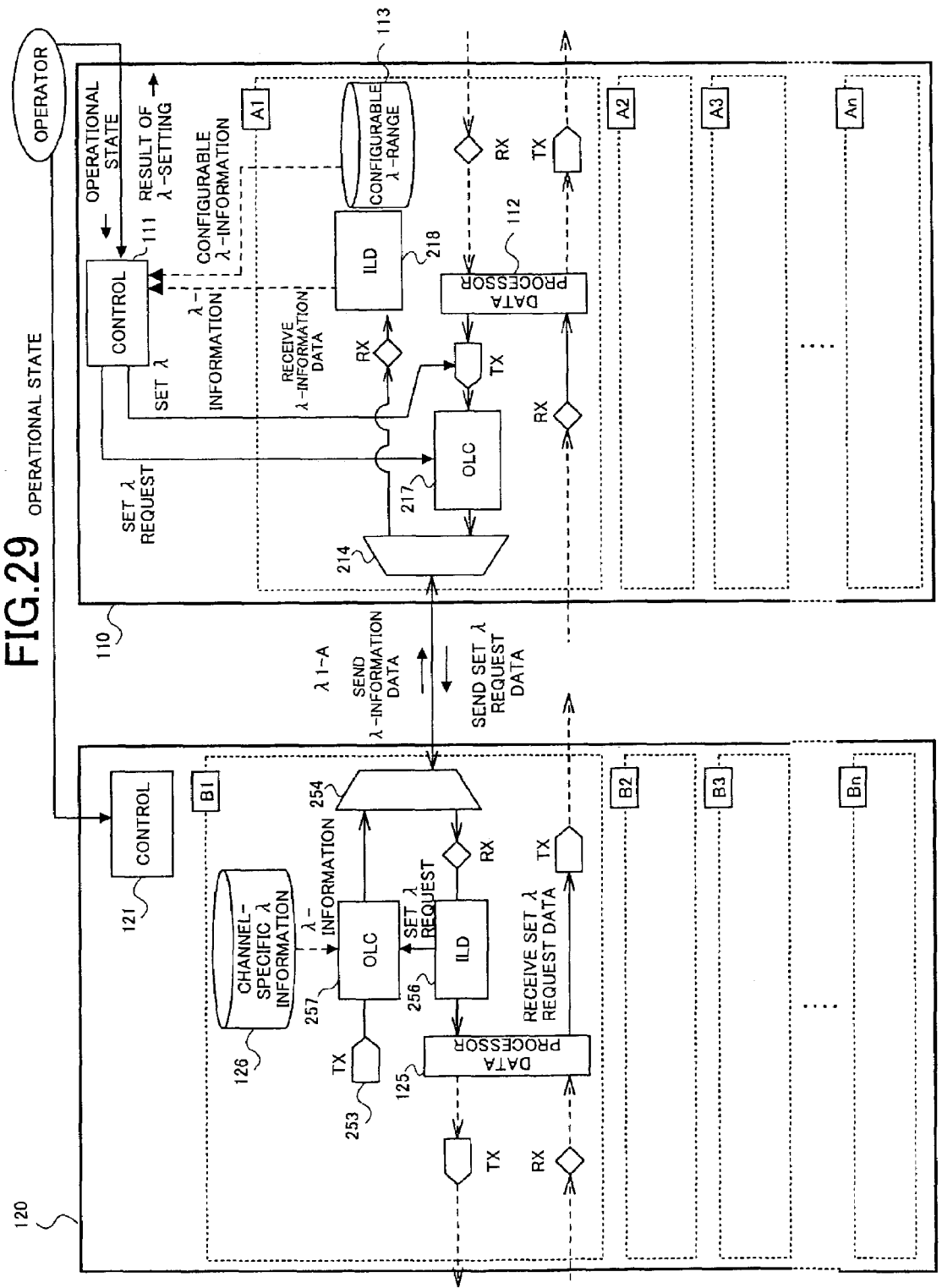
FIG. 29 is a block diagram showing a WDM device of a variant of the eighth embodiment of the present invention.

In other words, when the operator changes the state of the wavelength-converting subunit Ax from an idle state to an operational state, the control part 111 of the wavelength-converting unit 110 sends a λ-setting request to the encoder/modulator part 215 of the wavelength-converting subunit Ax in a case shown in FIG. 28 and to the output level controlling part 217 of the wavelength-converting subunit Ax in a case shown in FIG. 29. The encoder/modulator part 215 or the output level controlling part 217 that has received the λ-setting request modulates (using ON/OFF levels or intensity modulation as in the fourth and fifth embodiments) the λ-setting request data and sends the λ-setting request data (of predetermined patterns).

The data processing part 126 (in the example of FIG. 28) or the input level detecting part 256 (in the example of FIG. 29) that has received the λ-setting request data from the wavelength-converting subunit Ax transmits the λ-setting request to the encoder/modulator part 255 or the output level controlling part 257 of the wavelength interface subunit Bx.

Thereafter, in a manner similar to the fourth and fifth embodiments, the λ-information is transmitted from the wavelength interface subunit Bx to the wavelength-converting subunit Ax via the signal λ1-A. The wavelength-converting subunit Ax sets the received λ-information for its transmitting part TX.

Thus, according to the eighth embodiment, a coupler/decoupler made of optical couplers is provided, and therefore, a bi-directional signal communication can be performed between the wavelength-converting subunits Ax and Bx via an optical transmission path. Accordingly, an efficient use of the optical transmission path (fiber optics) can be achieved.

Now, a ninth embodiment of the present invention will be described with reference to FIGS. 30 through 32.

In the present embodiment, the wavelength λ of the optical signals transmitted from the wavelength interface unit 120 to the wavelength-converting unit 110 is analyzed and detected at the wavelength-converting unit 110 and the detected wavelength λ is set to the transmitter part of the wavelength-converting unit 110.

In detail, the wavelength-converting unit 110 is provided with a branching unit 219 with which the received data are divided into two parts. One part is connected to the prior art receiver part and the other part is input into a λ-analyzer 220 of the present invention. In this manner, the wavelength λ of the data received from the wavelength interface unit 120 is measured.

An operation of the ninth embodiment will be described with reference to a flowchart of FIG. 31.

In step S61, the operator inputs a data output request into the wavelength-converting unit 110. When the channel number and the λ-value (may also be unspecified) are passed to the control part 111, the control part 111 analyses the request (step S62).

If it is determined that the λ-value is specified in the request (step S63, YES), the specified λ-value is set to the transmitter part in a conventional manner (step S73).

On the other hand, if it is determined that the λ-value is not specified in the request (step S63, NO), it is determined whether the data processing part 112 is currently receiving signals (step S64). If the result indicates that the data processing part 112 is currently not receiving signals (step S64, NO), the operator is informed that an automatic setting has failed (informed of the channel number and a reason of refusal) (step S66) and the process terminates.

If the result of step S64 indicates that the data processing part 112 is currently receiving the signals (step S64, YES), the λ-measuring part 221 is activated and a λ-measurement request is sent (step S65). The λ-measurement part 221 that has received the λ-measurement request obtains from the λ-analyzer 220 the received λ-measurement value of the relevant reception signal (step S67).

Then, as will be described below, allowable ranges are added to the received λ-measurement value (lambda_measured) (step S68).

lambda_s=lambda_measured x (1−k)
lambda_l=lambda_measured x (1+k).

Then, the wavelength λ is sequentially read from the first wavelength λ contained in the first storage part (the values read out are stored in a variable lamda_enable). Then, as will be described below, a comparison is made to determine whether this value is within the allowable range obtained in step S68 (step S69).

That is to say, it is determined whether:
lambda_s<lambda_enable, and,
lambda_enable<lambda_l.

If the result shows that there is a wavelength λ (lambda_enable) that satisfies the above conditions, the wavelength λ is set (step S72). Then, a data output request is sent to the control part 111. When the control part 111 receives the data output request, it performs a process that is similar to the above-described process and sets the wavelength λ to the transmitter part TX.

Now, an operation will be described for a case in which after setting λ according to the process described above, the signal transmission from the wavelength interface unit 120 to the wavelength-converting unit 110 has halted for some reason. Such a case may be when there is a change of wavelength to be used for transmission to the upstream side and the transmission has interrupted temporarily.

It is determined whether the data processing part 112 has detected a data halt from the wavelength interface unit 120 (step S81). Then, the control part 111 sends DATA OFF to the operator (step S82). If it is determined that the data processing part 112 has detected DATA ON that indicates that signal reception from the wavelength interface unit 120 is initiated (step S83, YES), the control part 111 send DATA ON to the operator (step S84). In such a case, in order to determine whether there is a change of the receiving wavelength λ of the signal, a λ-measurement request is sent to the λ-measuring part 221 (step S85).

The λ-measuring part 221 that has received the λ-measurement request obtains the received λ-measurement value from the λ-analyzer 220 (step S86). Then, in step S87, a predetermined allowable range k is added to the received λ-measurement value (lambda_measured), as follows:

lambda_s=lambda_measured x (1−k)
lambda_l=lambda_measured x (1+k).

Then, it is compared and verified whether the current output λ-measurement value (lambda_old) of the wavelength-converting unit 110 is within the allowable range (step S88). That is to say, it is determined whether:

lambda_s<lambda_old, and,
lambda_old<lambda_l.

If the result indicates that the current output λ is within the allowable range (step S88, YES), it can be determined that λ has not been changed and the process is terminated. However, if the current output λ is not within the allowable range (step S88, NO), λ is reset.

That is to say, the wavelength λ is read out from the first wavelength λ stored in the first storage part 113 and then stored in variable lambda_enable (step S89). Then, it is compared whether the read out wavelength λ is within the allowable range (step S90). That is to say, it is determined whether:

lambda_s<lambda_enable, and,
lambda_enable<lambda_l.

If the result indicates that there is a wavelength λ (lambda_enable) that meets the above-conditions, it is set as a new wavelength λ (step S92). Then, a λ-alteration request is sent to the control part 111. The control part 111 performs a conventional λ-alteration process (step S93) and the process terminates.

A variant of the ninth embodiment shown in FIG. 30 will be described with reference to FIG. 33.

Figure 33:
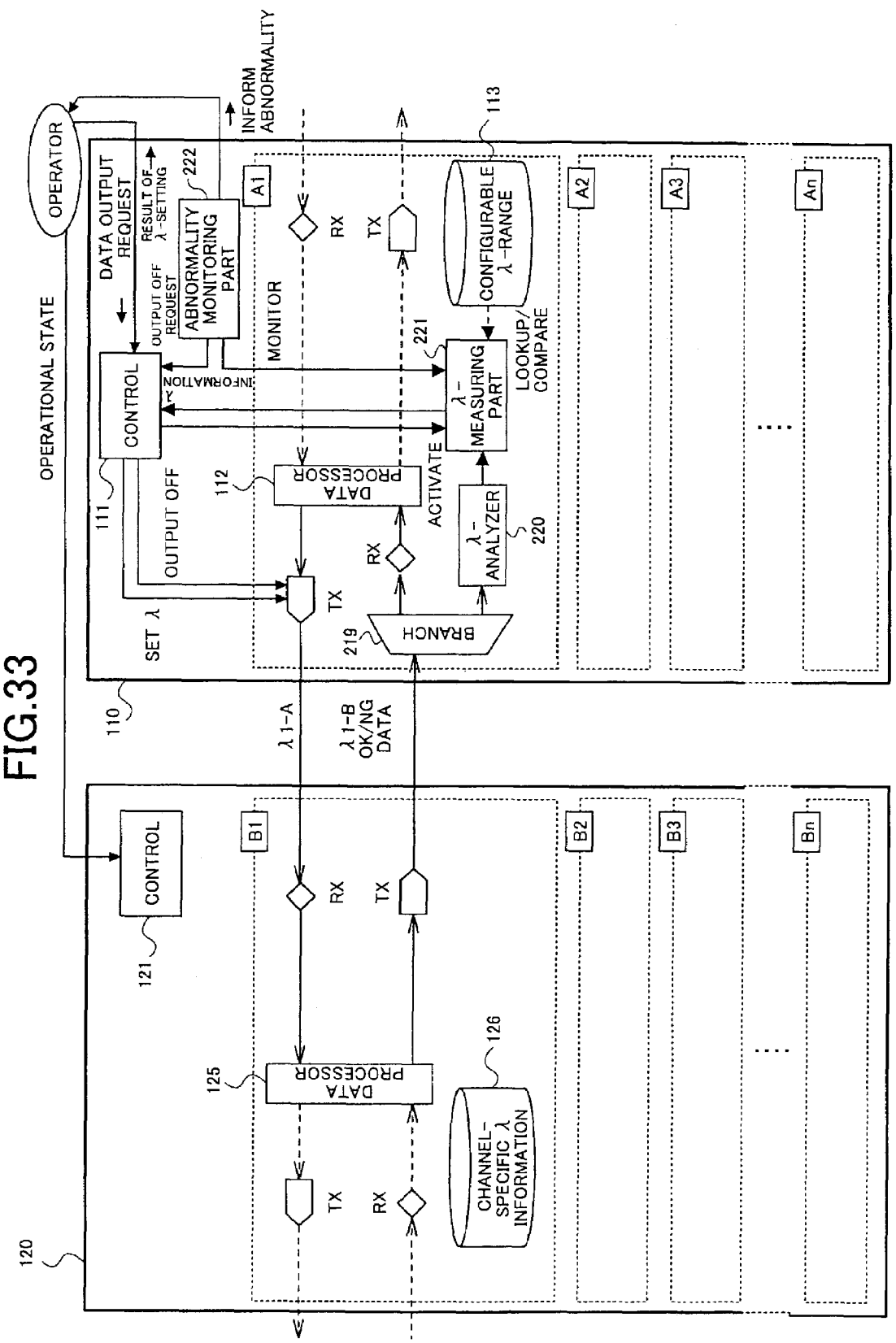
FIG. 33 is a block diagram showing a WDM device of a variant of the ninth embodiment of the present invention.

As shown in FIG. 33, the wavelength-converting unit 110 is further provided with an abnormality monitoring part 222. The abnormality monitoring part 222 monitors the λ-measuring part 221. If all trials for λ should fail (step S71, YES), the abnormality monitoring part 222 informs the operator of the abnormality.

Also, if trials for λ should fail upon recovering from the DATA OFF state to the DATA ON state (step S91, YES), the abnormality monitoring part 222 sends a data output OFF request to the control part 111.

Figure 34:
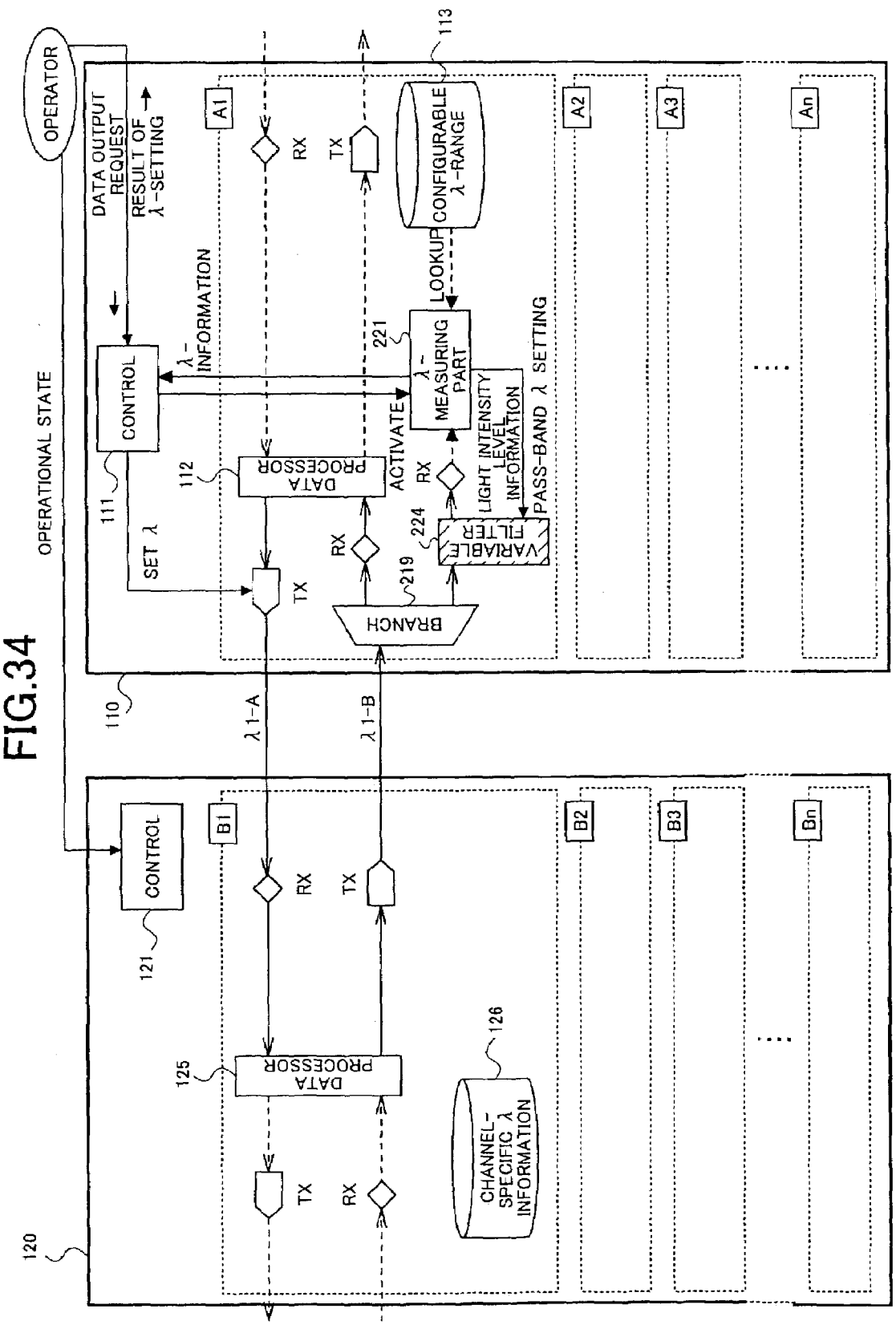
FIG. 34 is a block diagram showing a WDM device of a tenth embodiment of the present invention.

A tenth embodiment of the present invention will be described with reference to FIGS. 34 through 36.

Figure 30:
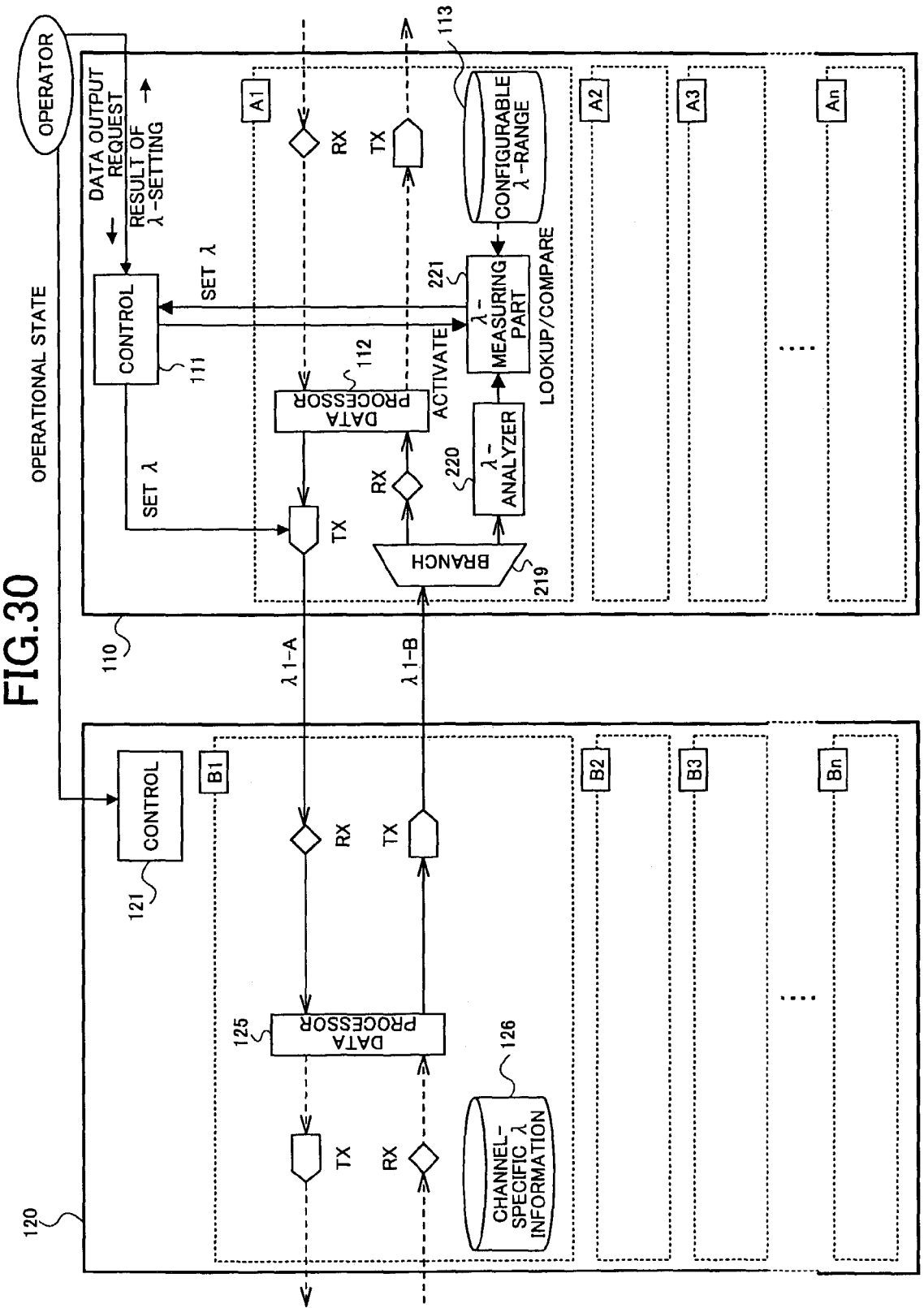
FIG. 30 is a block diagram showing a WDM device of a ninth embodiment of the present invention.

The tenth embodiment is similar to the ninth embodiment shown in FIG. 30 except that, instead of the λ-analyzer, a variable wavelength filter 224 is provided in the wavelength-converting unit 110. A filter coefficient, i.e., pass band, of the variable wavelength filter 224 is sequentially altered such that a wavelength λ that can be output is passed. In such a manner, the wavelength λ of the signal that is passed is detected by means of the variable wavelength filter 224.

Figure 31:
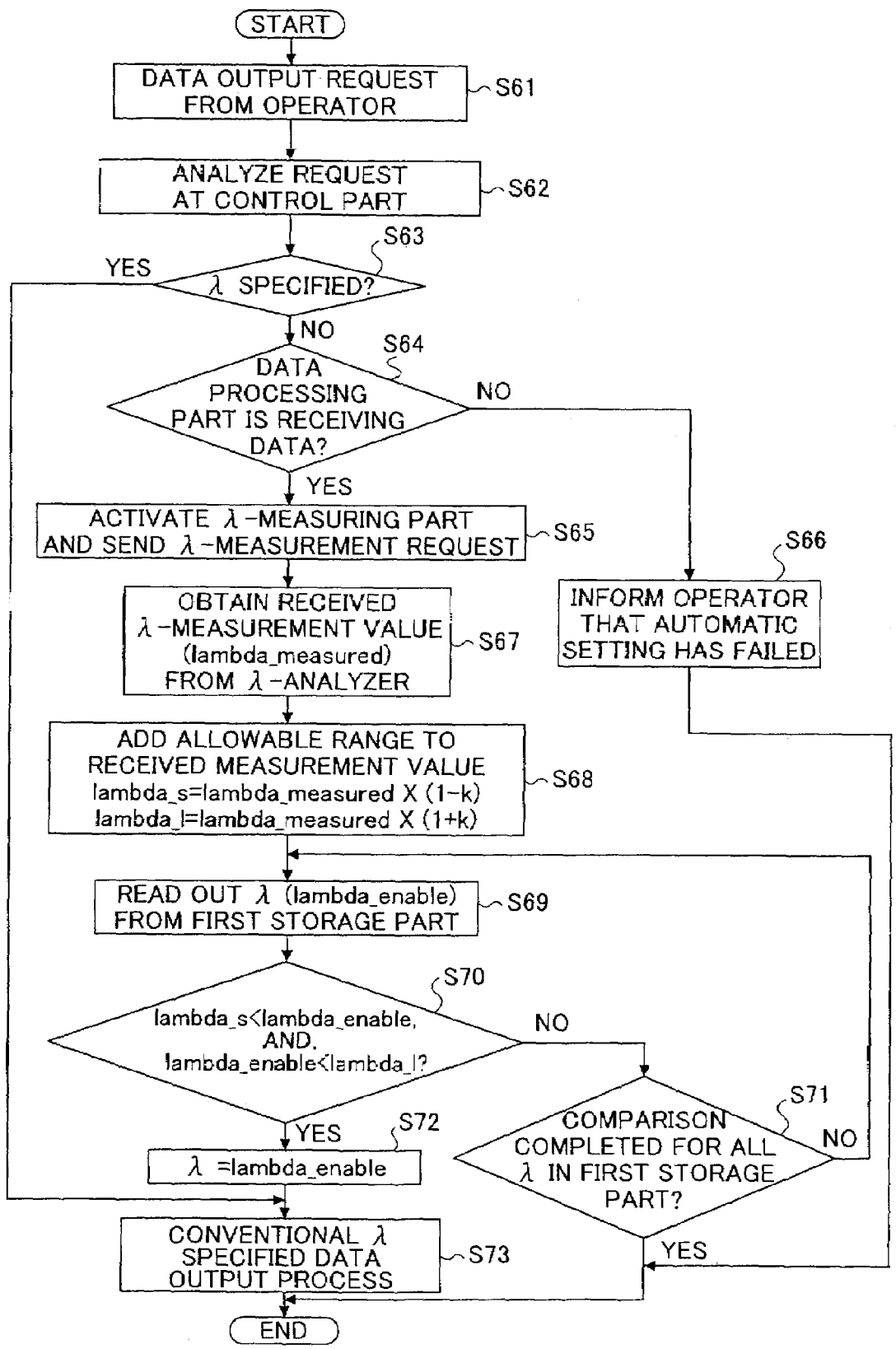
FIG. 31 is a flowchart showing process steps of an operation of a WDM device of the ninth embodiment of the present invention.
Figure 35:
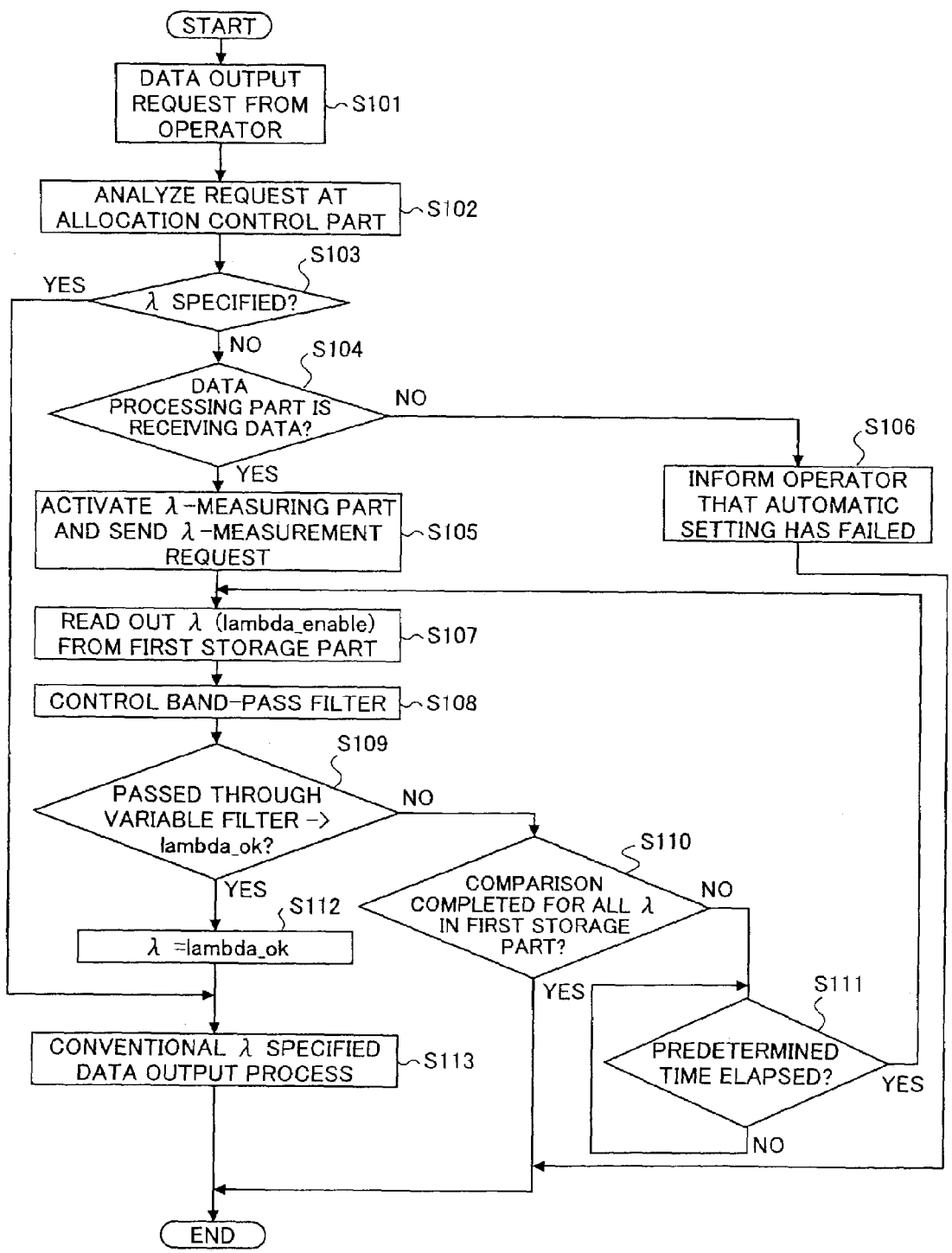
FIG. 35 is a flowchart showing process steps of an operation of a WDM device of the tenth embodiment of the present invention.

That is to say, when the operator inputs a data output request input into the wavelength-converting unit 110 in step S101 of FIG. 35, steps S101 through S105 are performed that are similar to the steps S61 through S65 shown in FIG. 31.

After receiving the λ-measurement request, the λ-measurement part 221 reads out the first wavelength λ stored in the first storage part 113 and stores it in variable lambda_enable (step S107). The variable wavelength filter 224 is controlled such that the signal can pass through only when its wavelength λ matches lambda_enable (step S108). After a certain time interval (e.g., five seconds) has elapsed (step S111, YES), the variable wavelength filter 224 is controlled such that the next wavelength λ in the first storage part 113 is passed through (steps S107 and S108). Thereafter, the wavelength λ that is allowed to pass through the variable wavelength filter 224 is changed at a constant interval (a loop from steps S107 to S111).

Meanwhile, the data processing part 112 monitors the light intensity level of the received data. If it is determined that the received data have passed through the variable wavelength filter 224 (step S109, YES), the setting value λ of the filter 224 is stored in lambda_ok (step S112). Then, a data output request is sent to the control part 111. Then, the control part 111 performs the conventional λ specified data output setting process (S113) and terminates the operation.

Figure 32:
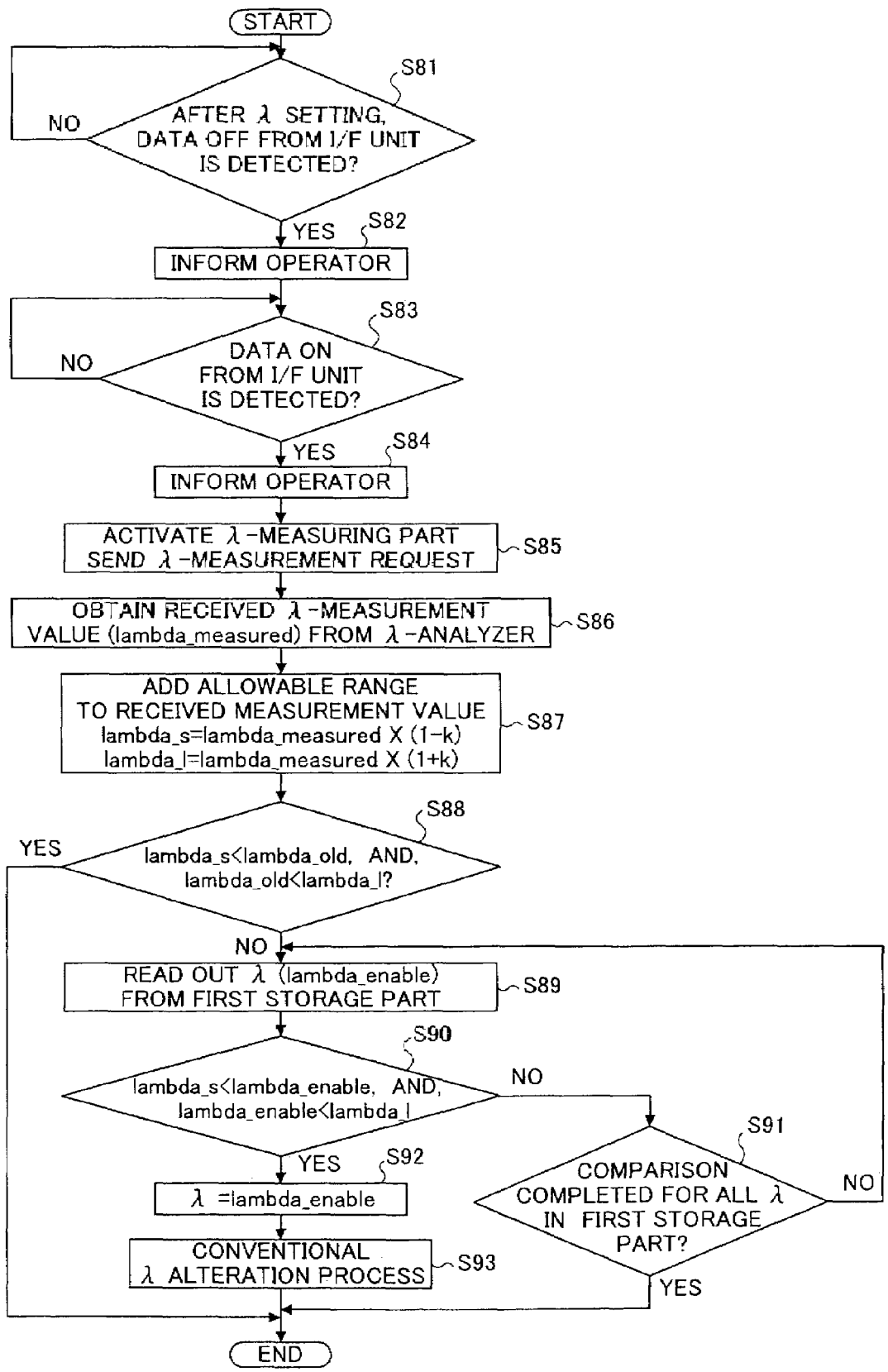
FIG. 32 is a flowchart showing another example of process steps of an operation of a WDM device of the ninth embodiment of the present invention.
Figure 36:
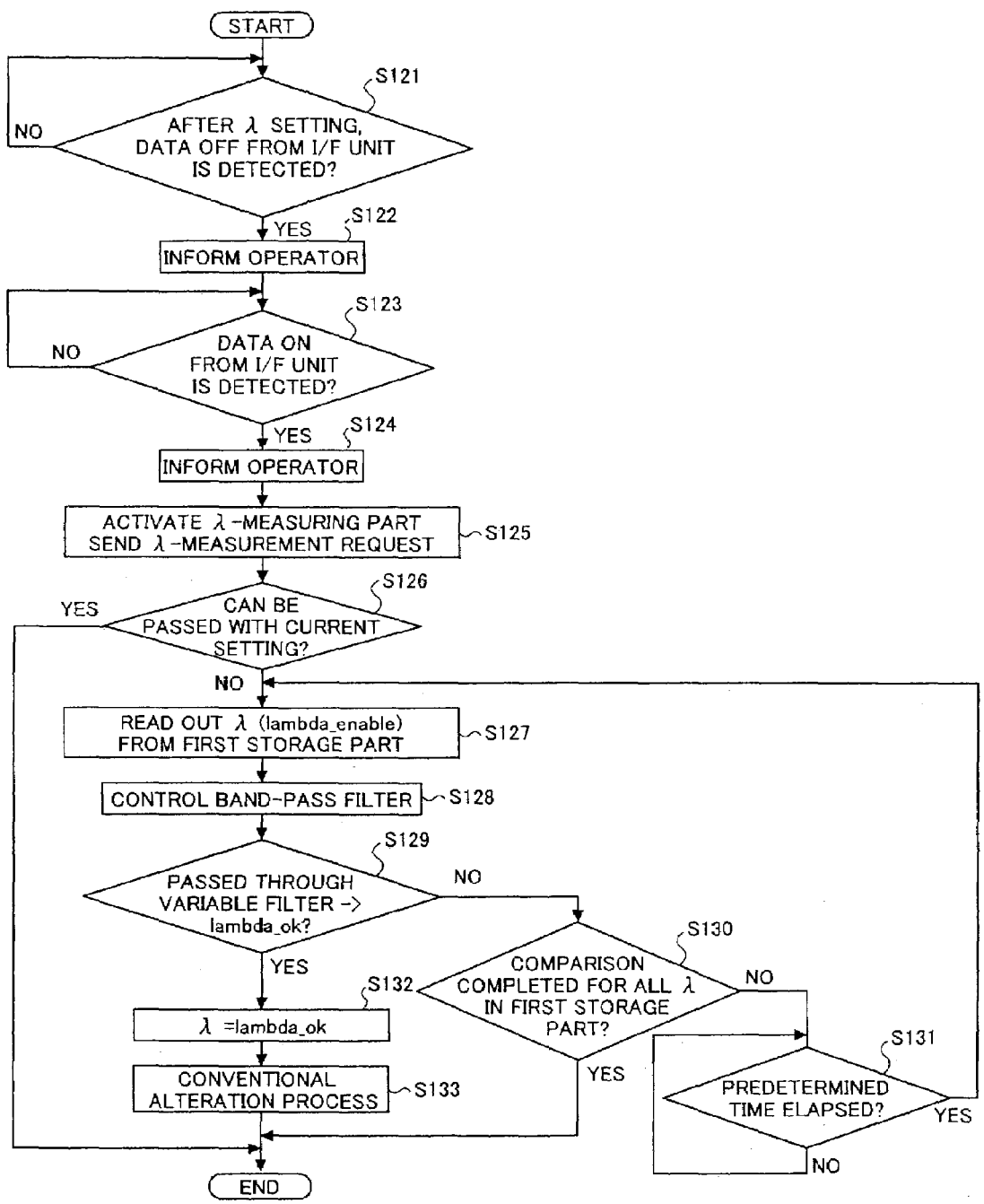
FIG. 36 is a flowchart showing another example of process steps of an operation of a WDM device of the tenth embodiment of the present invention.

When recovering from DATA OFF to DATA ON, steps S121 through S125 that are similar to the steps S81 through S85 of FIG. 32 are performed (see FIG. 36). The λ-measuring part 221 that has received the λ-measuring request determines whether the received signal can pass through the variable wavelength filter 224 at the current setting (steps S126). If the received signal passes through the variable wavelength filter 224 (steps S126, YES), λ has not been altered and the operation is completed. If it is determined that the received signal is not allowed to pass through the variable wavelength filter 224 (step S216, NO), the wavelength λ is reset.

In order to reset the wavelength λ, the λ-measuring part 221 that has received the λ-measuring request controls the coefficient of the variable wavelength filter 224 such that the first wavelength λ stored in the first storage part 113 (lambda_enable) is allowed to pass through (steps S127 and S128). After a predetermined time period (e.g., t=5[s]) has elapsed (step S131, YES), the variable wavelength filter 224 is controlled such that the next wavelength λ is allowed to pass through (steps S127 and S128). Thereafter, the wavelength λ that is allowed to pass through the variable wavelength filter 224 is changed at a constant interval (a loop from steps S127 to S131).

Meanwhile, the data processing part 112 monitors the light intensity level of the received data. If it is determined that the received data have passed through the variable wavelength filter 224 (step S129, YES), the setting value λ of the filter 224 is stored in lambda_ok (step S132). Then, a request to change λ is sent to the control part 111. Then, the control part 111 performs the conventional λ changing process (step S133) and terminates the operation.

Figure 37:
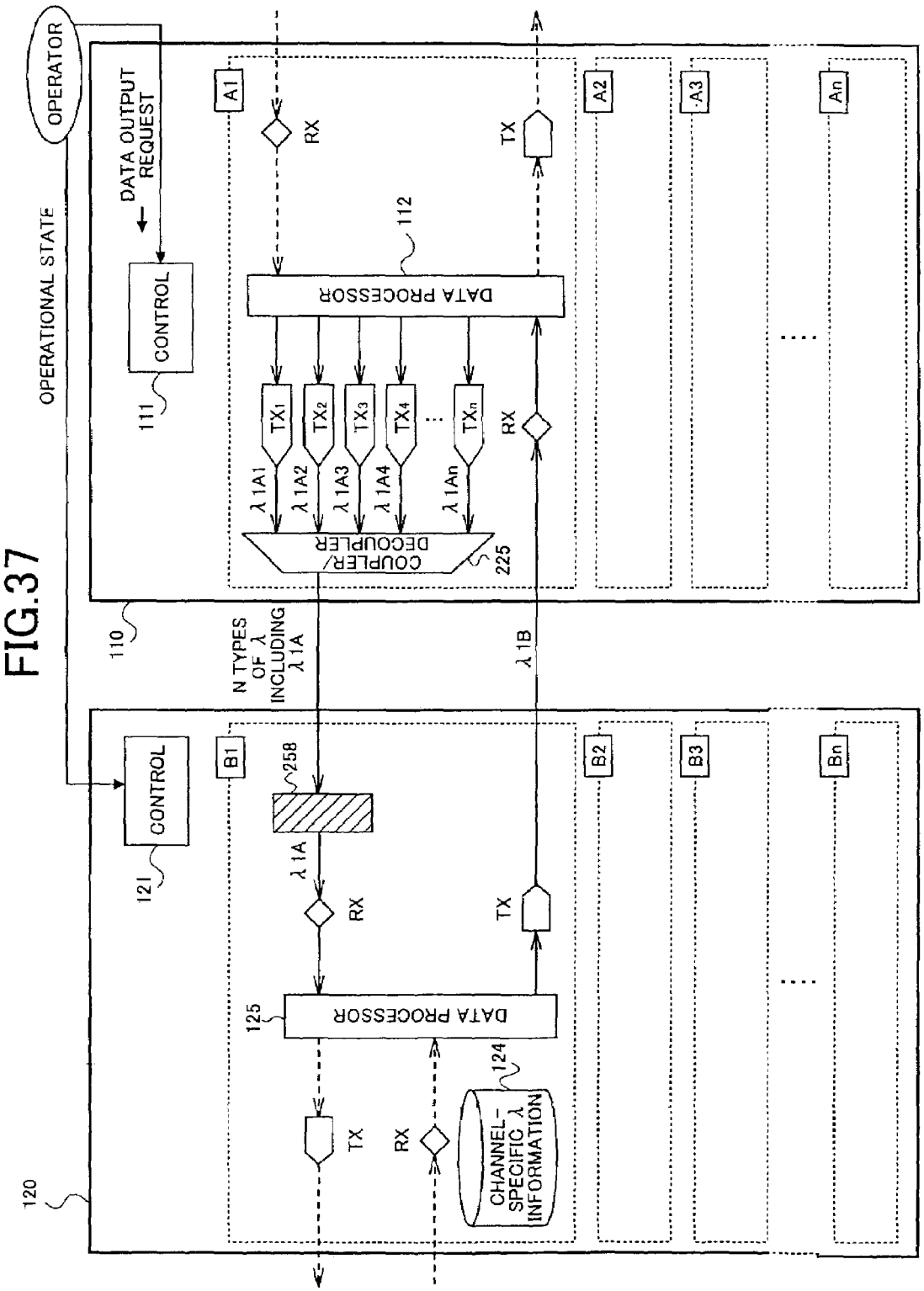
FIG. 37 is a block diagram showing a WDM device of an eleventh embodiment of the present invention.
Figure 38:
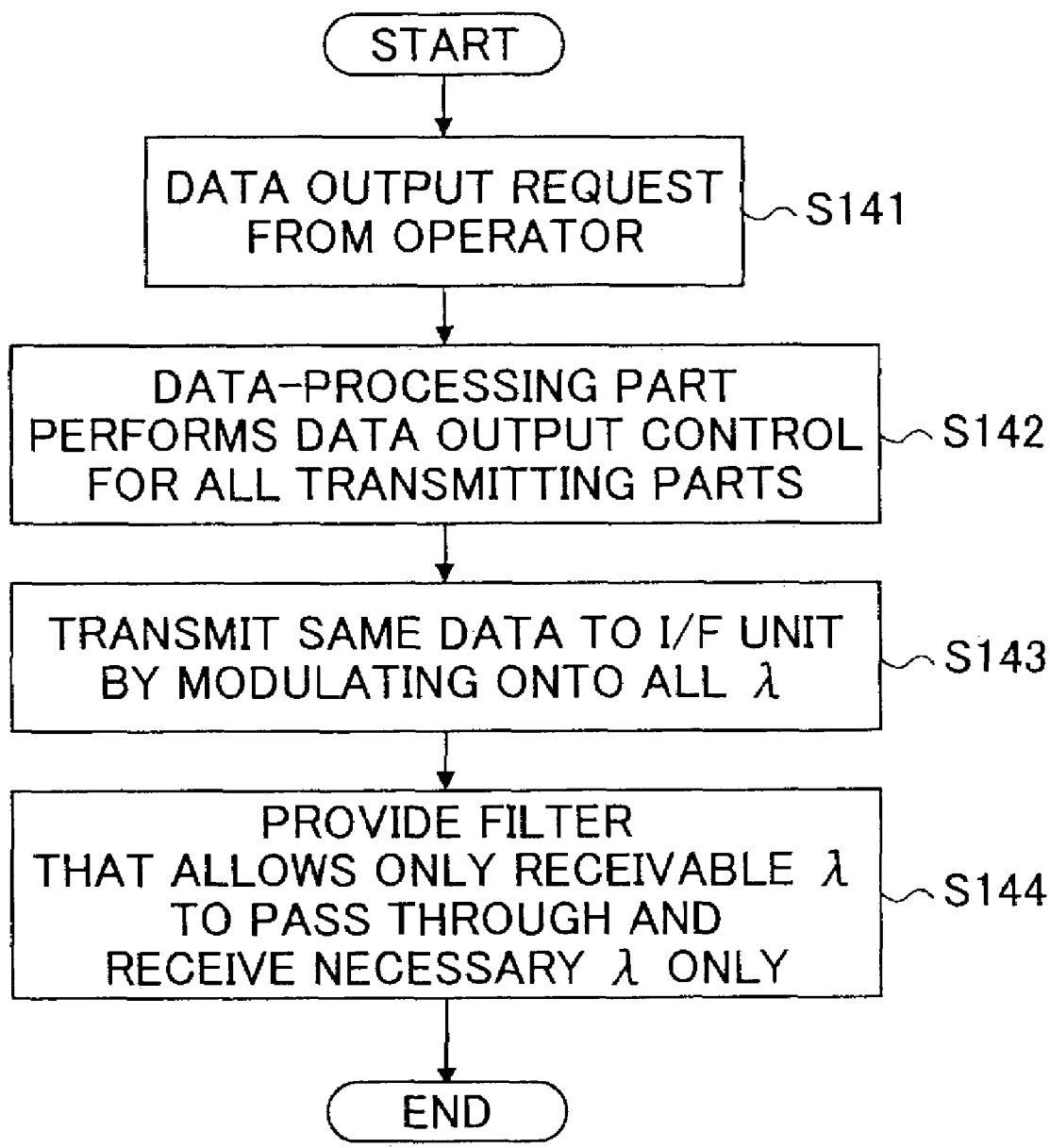
FIG. 38 is a flowchart showing process steps of an operation of a WDM device of the eleventh embodiment of the present invention.

An eleventh embodiment of the present invention will be described with reference to FIGS. 37 and 38. In the prior art, the wavelength λ to be output to the upstream side of the wavelength-converting unit 110 is determined by varying the wavelength λ at the upstream output part of the wavelength-converting unit 110 such that the output wavelength λ matches a wavelength λ that is receivable at the wavelength interface subunit Bx of the opposing wavelength interface unit 120. In the present embodiment, all wavelengths λ are output from the wavelength-converting unit 110 (steps S141 and S142). All the wavelengths λ are coupled into a single ray in the coupler/decoupler 225 and the single ray is output from the upstream output part of the wavelength-converting unit 110 (step S143). Also, the wavelength interface subunit Bx of the wavelength interface unit 120 is provided with a filter 258 at a position downstream of the receiving part. The filter 258 allows only a wavelength λ unique to each wavelength interface subunit Bx to pass through (step S144).

According to the eleventh embodiment, all of the wavelength-converting subunits Ax of the wavelength-converting unit 110 may be of the same structure and also adjustment or setting of the wavelength λ is not necessary.

Further, the present invention is not limited to these embodiments, and variations and modifications may be made without departing from the scope of the present invention.

The present application is based on Japanese priority application No. 2002-164675 filed on Jun. 5, 2002, the entire contents of which are hereby incorporated by reference.

What is claimed is:

1. A wavelength-division multiplexing (WDM) device comprising:
   a multiplexing part having a plurality of input terminals that are capable of receiving fixed wavelengths, respectively, and an output terminal, said fixed wavelengths being multiplexed onto a multiplexed signal and output via said output terminal;
   a wavelength-converting unit having a plurality of wavelength-converting parts each connected to an optical transmission device so as to convert an input wavelength from said optical transmission device into a converted wavelength corresponding to said fixed wavelength;
   a wavelength interface unit having a plurality of interface parts each connected between an input terminal of said multiplexing part and a wavelength-converting part, each said interface part having a specific wavelength that matches the fixed wavelength of said input terminal of said multiplexing part;
   a filter within each said interface part that allows said specific wavelength to pass through an encoder/modulator that encodes and modulates the filtered signal into a pattern specific to said interface part; and
   a detection unit that detects said specific wavelength of said interface part by sequentially altering the converted wavelength, analyzing wavelengths of the multiplexed signal to detect said encoded and modulated signal wherefrom said pattern specific to said interface part is obtained and identifying said interface part and its specific wavelength.

2. The WDM device as claimed in claim 1, further comprising repeating means for repeating an operation of detecting the fixed wavelengths of the connected output terminal by sequentially altering the converted wavelength from said wavelength-converting part; and
   outputting means for outputting a signal indicating an abnormal state when number of repetition exceeds a predetermined number.

3. The WDM device as claimed in claim 1, further comprising a storage part within each wavelength-converting part in which information of the converted wavelength for the wavelength-converting part whose converted wavelength has already been determined is stored.

4. The WDM device as claimed in claim 1, further comprising a coupler/decoupler for said plurality of wavelength-converting parts and a coupler/decoupler for said plurality of interface parts so as to enable signal communication between said plurality of wavelength-converting parts and said plurality of interface parts using a single transmission path.

5. A wavelength-division multiplexing (WDM) device comprising:
   a multiplexing part having a plurality of input terminals that are capable of receiving fixed wavelengths, respectively, and an output terminal, said fixed wavelengths being multiplexed onto a multiplexed signal and output via said output terminal;
   a wavelength-converting unit having a plurality of wavelength-converting parts each connected to an optical transmission device so as to convert an input wavelength from said optical transmission device into a converted wavelength corresponding to said fixed wavelength;
   a wavelength interface unit having a plurality of interface parts each connected between an input terminal of said multiplexing part and a wavelength-converting part, each said interface part having a specific wavelength that matches the fixed wavelength of said input terminal of said multiplexing part;
   an encoder/modulator within each said interface part that encodes and modulates an optical signal in a pattern specific to said specific wavelength and said interface part transmits the encoded and modulated optical signal to the wavelength-converting part connected thereto; and
   a detection unit that detects said specific wavelength of said interface part by reading said specific wavelength from a modulated component of said encoded and modulated optical signal.

6. The WDM device as claimed in claim 5, wherein said encoder/modulator encodes and modulates the optical signal by stopping and restarting the transmission of the optical signal at a predetermined timing specific to the relevant interface part such that the interface parts can be uniquely and individually identified.

7. The WDM device as claimed in claim 5, wherein said encoder/modulator encodes and modulates the optical signal by altering the intensity of the optical signal at a predetermined timing specific to the relevant interface part such that the interface parts can be uniquely and individually identified.

8. The WDM device as claimed in claim 5, wherein information of the specific wavelength of the interface part is reported by modulating said optical signal and an operation of detecting the specific wavelength at the wavelength-converting part is initiated by an operational input by an operator.

9. The WDM device as claimed in claim 5, further comprising a coupler/decoupler for said plurality of wavelength-converting parts and a coupler/decoupler for said plurality of interface parts so as to enable signal communication between said plurality of wavelength-converting parts and said plurality of interface parts using a single transmission path.

10. A wavelength-division multiplexing (WDM) device comprising:
    a multiplexing part having a plurality of input terminals that are capable of receiving fixed wavelengths, respectively, and an output terminal, said fixed wavelengths being multiplexed onto a multiplexed signal and output via said output terminal;
    a wavelength-converting unit having a plurality of wavelength-converting parts each connected to an optical transmission device so as to convert an input wavelength from said optical transmission device into a converted wavelength corresponding to said fixed wavelength; and a wavelength interface unit having a plurality of interface parts each connected between an input terminal of said multiplexing part and a wavelength-converting part, each said interface part having a specific wavelength that matches the fixed wavelength of said input terminal of said multiplexing part, a detection unit that detects said specific wavelength of each said interface part by each said interface part transmitting optical signals of said specific wavelength to the wavelength-converting part connected thereto, and said wavelength-converting part analyzes the wavelength of the transmitted optical signal to detect the specific wavelength of said interface part.

11. The WDM device as claimed in claim 10, further comprising means for generating a signal indicating an abnormal state if the wavelength value obtained by said analysis is not within the configurable wavelength range of said wavelength-converting part.

12. The WDM device as claimed in claim 10, further comprising a coupler/decoupler for said plurality of wavelength-converting parts and a coupler/decoupler for said plurality of interface parts so as to enable signal communication between said plurality of wavelength-converting parts and said plurality of interface parts using a single transmission path.

13. A method of automatically setting a converted wavelength output from each of a plurality of wavelength-converting parts of a wavelength-division multiplexing (WDM) device, said WDM device including:

a multiplexing part having a plurality of input terminals that are capable of receiving fixed wavelengths, respectively, and an output terminal, said fixed wavelengths being multiplexed onto a multiplexed signal and output via said output terminal;

a wavelength-converting unit having a plurality of wavelength-converting parts each connected to an optical transmission device so as to convert an input wavelength from said optical transmission device into a converted wavelength corresponding to said fixed wavelength;

a wavelength interface unit having a plurality of interface parts each connected between an input terminal of said multiplexing part and a wavelength-converting part, each said interface part having a specific wavelength that matches the fixed wavelength of said input terminal of said multiplexing part;

a filter within each said interface part that allows said specific wavelength to pass through an encoder/modulator that encodes and modulates the filtered signal into a pattern specific to said interface part; and a detection unit that detects said specific wavelength of said interface part by sequentially altering the converted wavelength, analyzing wavelengths of the multiplexed signal to detect said encoded and modulated signal wherefrom said pattern specific to said interface part is obtained and identifying said interface part and its specific wavelength.

14. A wavelength-division multiplexing (WDM) device comprising:

a multiplexing part having a plurality of input terminals that are capable of receiving fixed wavelengths, respectively, and an output terminal, said fixed wavelengths being multiplexed onto a multiplexed signal and output via said output terminal;

a wavelength-converting unit having a plurality of wavelength-converting parts each connected to an optical transmission device so as to convert an input wavelength from said optical transmission device into a converted wavelength corresponding to said fixed wavelength;

a wavelength interface unit having a plurality of interface parts each connected between an input terminal of said multiplexing part and a wavelength-converting part, each said interface part having a specific wavelength that matches the fixed wavelength of said input terminal of said multiplexing part; and a determination unit that determines said specific wavelength of said interface part by said interface part transmitting optical signals of its specific wavelength to the wavelength-converting part connected thereto, and said optical signals of the specific wavelength being supplied to a variable wavelength filter provided in said wavelength-converting part while varying the pass-band wavelength of said variable wavelength filter so as to obtain the pass-band wavelength of said filter when said optical signal is allowed to pass through.

15. The WDM device as claimed in claim 14, further comprising means for generating a signal indicating an abnormal state if the signal from said interface part does not pass through said variable wavelength filter even if the pass-band of said variable wavelength filter has been altered.

16. The WDM device as claimed in claim 14, further comprising a coupler/decoupler for said plurality of wavelength-converting parts and a coupler/decoupler for said plurality of interface parts so as to enable signal communication between said plurality of wavelength-converting parts and said plurality of interface parts using a single transmission path.

17. A method comprising:

automatically setting a converted wavelength output from each of a plurality of wavelength-converting parts of a wavelength-division multiplexing (WDM) device, said WDM device comprising:

a multiplexing part having a plurality of input terminals that are capable of receiving fixed wavelengths, respectively, and an output terminal, said fixed wavelengths being multiplexed onto a multiplexed signal and output via said output terminal;

a wavelength-converting unit having a plurality of wavelength-converting parts each connected to an optical transmission device so as to convert an input wavelength from said optical transmission device into a converted wavelength corresponding to said fixed wavelength;

a wavelength interface unit having a plurality of interface parts each connected between an input terminal of said multiplexing part and a wavelength-converting part, each said interface part having a specific wavelength that matches the fixed wavelength of said input terminal of said multiplexing part;

an encoder/modulator within each said interface part that encodes and modulates an optical signal in a pattern specific to said specific wavelength and said interface part transmits the encoded and modulated optical signal to the wavelength-converting part connected thereto; and a detection unit that detects said specific wavelength of said interface part by reading said specific wavelength from a modulated component of said encoded and modulated optical signal.

18. A method comprising:
automatically setting a converted wavelength output from each of a plurality of wavelength-converting parts of a wavelength-division multiplexing (WDM) device, said WDM device comprising:
a multiplexing part having a plurality of input terminals that are capable of receiving fixed wavelengths, respectively, and an output terminal, said fixed wavelengths being multiplexed onto a multiplexed signal and output via said output terminal;
a wavelength-converting unit having a plurality of wavelength-converting parts each connected to an optical transmission device so as to convert an input wavelength from said optical transmission device into a converted wavelength corresponding to said fixed wavelength;
a wavelength interface unit having a plurality of interface parts each connected between an input terminal of said multiplexing part and a wavelength-converting part, each said interface part having a specific wavelength that matches the fixed wavelength of said input terminal of said multiplexing part; and
a determination unit that determines said specific wavelength of said interface part by said interface part transmitting optical signals of its specific wavelength to the wavelength-converting part connected thereto, and said optical signals of the specific wavelength being supplied to a variable wavelength filter provided in said wavelength-converting part while varying the pass-band wavelength of said variable wavelength filter so as to obtain the pass-band wavelength of said filter when said optical signal is allowed to pass through.

19. A method of automatically setting a converted wavelength output from each of a plurality of wavelength-converting parts of a wavelength-division multiplexing (WDM) device, the method comprising:
receiving fixed wavelengths at a plurality of input terminals of a multiplexing part of the WDM device and multiplexing the fixed wavelengths onto a multiplexed signal that is output via an output terminal of the WDM device;
converting an input wavelength, from an optical transmission device that is connected to each of a plurality of wavelength-converting parts of a wavelength-converting unit of the WDM device, into a converted wavelength corresponding to the fixed wavelength;
connecting a plurality of interface parts of a wavelength interface unit of the WDM device between an input terminal of the multiplexing part of the WDM device and a wavelength-converting part of the WDM device, each interface part having a specific wavelength that matches the fixed wavelength of the input terminal of the multiplexing part;
encoding and modulating an optical signal in a pattern specific to the specific wavelength, the interface part transmitting the encoded and modulated optical signal to the wavelength-converting part connected thereto; and
detecting the specific wavelength of the interface part by reading the specific wavelength from a modulated component of the encoded and modulated optical signal.

20. A method of automatically setting a converted wavelength output from each of a plurality of wavelength-converting parts of a wavelength-division multiplexing (WDM) device, the method comprising:
receiving fixed wavelengths at a plurality of input terminals of a multiplexing part of the WDM device and multiplexing the fixed wavelengths onto a multiplexed signal that is output via an output terminal of the WDM device;
converting an input wavelength, from an optical transmission device that is connected to each of a plurality of wavelength-converting parts of a wavelength-converting unit of the WDM device, into a converted wavelength corresponding to the fixed wavelength;
connecting a plurality of interface parts of a wavelength interface unit of the WDM device between an input terminal of the multiplexing part of the WDM device and a wavelength-converting part of the WDM device, each interface part having a specific wavelength that matches the fixed wavelength of the input terminal of the multiplexing part; and
determining the specific wavelength of the interface part by the interface part transmitting optical signals of the specific wavelength to the wavelength-converting part connected thereto, the optical signals of the specific wavelength being supplied to a variable wavelength filter provided in the wavelength-converting part while varying the pass-band wavelength of the variable wavelength filter so as to obtain the pass-band wavelength of the filter when the optical signal is allowed to pass through.

21. A method of automatically setting a converted wavelength output from each of a plurality of wavelength-converting parts of a wavelength-division multiplexing (WDM) device, said WDM device including:
a multiplexing part having a plurality of input terminals that are capable of receiving fixed wavelengths, respectively, and an output terminal, said fixed wavelengths being multiplexed onto a multiplexed signal and output via said output terminal;
a wavelength-converting unit having a plurality of wavelength-converting parts each connected to an optical transmission device so as to convert an input wavelength from said optical transmission device into a converted wavelength corresponding to said fixed wavelength; and
a wavelength interface unit having a plurality of interface parts each connected between an input terminal of said multiplexing part and a wavelength-converting part, each said interface part having a specific wavelength that matches the fixed wavelength of said input terminal of said multiplexing part,
a detection unit that detects said specific wavelength of each said interface part by each said interface part transmitting optical signals of said specific wavelength to the wavelength-converting part connected thereto, and said wavelength-converting part analyzes the wavelength of the transmitted optical signal to detect the specific wavelength of said interface part.

* * * * *